US005675362A

United States Patent [19]

Clough et al.

[11] Patent Number: 5,675,362

[45] Date of Patent: *Oct. 7, 1997

[54] PORTABLE COMPUTER WITH TOUCH SCREEN AND COMPUTING SYSTEM EMPLOYING SAME

[75] Inventors: William A. Clough, Bainsville; Daneil Ouelette, St. Luc; Serge De La Sablonniere, Ville d'Anjou, all of Canada

[73] Assignee: Microslate, Inc., Canada

[ * ] Notice: The term of this patent shall not extend beyond the expiration date of Pat. No. 5,379,057.

[21] Appl. No.: 319,464

[22] Filed: Oct. 4, 1994

Related U.S. Application Data

[63] Continuation of Ser. No. 98,219, Jul. 28, 1993, Pat. No. 5,379,057, which is a continuation of Ser. No. 890,311, May 26, 1992, abandoned, which is a continuation of Ser. No. 731,375, Jul. 16, 1991, abandoned, which is a continuation of Ser. No. 271,237, Nov. 14, 1988, abandoned.

[51] Int. Cl.$^6$ .................. G09G 5/00; G09G 5/12
[52] U.S. Cl. .................. 345/173; 345/2; 364/705.06; 364/709.11
[58] Field of Search .................. 345/2, 173; 341/23; 364/708, 709.01, 709.06, 709.1, 709.11, 709.12, 709.13, 705.06; 178/18

[56] References Cited

U.S. PATENT DOCUMENTS

| | | |
|---|---|---|
| 4,159,417 | 6/1979 | Rubincam . |
| 4,185,282 | 1/1980 | Pick . |
| 4,202,041 | 5/1980 | Kaplow et al. . |
| 4,224,615 | 9/1980 | Penz . |
| 4,291,198 | 9/1981 | Anderson et al. . |
| 4,332,464 | 6/1982 | Bartulis et al. . |
| 4,347,956 | 9/1982 | Berger . |
| 4,360,345 | 11/1982 | Hon . |
| 4,431,870 | 2/1984 | May et al. . |
| 4,449,186 | 5/1984 | Kelly et al. . |
| 4,451,895 | 5/1984 | Sliwkoski . |
| 4,509,526 | 4/1985 | Barnes et al. . |
| 4,545,023 | 10/1985 | Mizzi . |
| 4,547,851 | 10/1985 | Kurland . |
| 4,553,222 | 11/1985 | Kurland et al. . |
| 4,555,699 | 11/1985 | Citron et al. . |
| 4,622,437 | 11/1986 | Bloom et al. . |
| 4,649,499 | 3/1987 | Sutton et al. . |
| 4,653,086 | 3/1987 | Laube . |
| 4,659,876 | 4/1987 | Sullivan et al. . |
| 4,667,299 | 5/1987 | Dunn . |
| 4,725,694 | 2/1988 | Auer et al. . |
| 4,763,356 | 8/1988 | Day, Jr. et al. . |
| 4,775,935 | 10/1988 | Yourick . |
| 4,782,521 | 11/1988 | Bartlett et al. . |
| 4,821,029 | 4/1989 | Logan et al. . |
| 4,845,650 | 7/1989 | Meade et al. . |
| 5,379,057 | 1/1995 | Clough et al. ............... 345/173 |

FOREIGN PATENT DOCUMENTS

| | | |
|---|---|---|
| 0053061 | 6/1982 | European Pat. Off. . |
| 0271280 | 6/1988 | European Pat. Off. . |
| 424589 | 5/1911 | France . |
| 2739157 | 3/1979 | Germany . |
| 2156114 | 10/1985 | United Kingdom . |
| 2193023 | 1/1988 | United Kingdom . |
| 8901658 | 2/1989 | WIPO . |

OTHER PUBLICATIONS

Data Bases Why They're Finally Usable, Joanne Kelleher, pp. 80, 83, 85, 87, Personal Computing, Oct. 1986.
Paradox 1.1, Rusel DeMaria, Byte, V.11, Sep. 1986, pp. 303, 306, 308.
R:Base Gets a Lot Better, Personal Computing V. 12, May 1988 pp. 222–224, Marvin Bryan.
And Now dBase IV, Miriam Liskin, Personal Computing, V.12 pp. 104–110, May 1988.
Advanced Features from New R:Base (System V), Cheryl Spencer, Personal Computing V. 10, pp. 156, 158, Nov. 1986.
Guru, Ernest R. Tello, Byte, V.11, pp. 281–282, 284–285, Aug. 1986.
The New Data Base Functionality, Personal Computing, V.10, Amanda C. Hixson, pp. 102–111, Jun. 1986.
dBase III Plus, Personal Computing, V.10, Miriam Liskin, pp. 201, 202, 204, 208, May 1986.
Highlights of Two Shows, Byte, V. 11, William M. Raike, pp. 317–320, Feb., 1986.
New Database Ideas, Dick Poutain, Byte, V. 10, pp. 389, 390 392, 394, 396, 397, Apr. 1985.
Educational Technology article entitled "A General Issue Examining Aspects of Educational Technology," vol. XXIV, No. 8, Aug., 1984, pp. 27–30.
Byte article entitled "The HP 150 Computer," Mark Haas, Nov. 1984, pp. 262–275.

(List continued on next page.)

*Primary Examiner*—Jeffery Brier
*Attorney, Agent, or Firm*—Cesari and McKenna

[57] ABSTRACT

A portable, self-contained general purpose keyboardless computer utilizes a touch screen display for data entry purposes. An application generator allows the user to develop data entry applications by combining the features of sequential libraries, consequential libraries, help libraries, syntax libraries, and pictogram libraries into an integrated data entry application. A run-time executor allows the processor to execute the data entry application.

13 Claims, 18 Drawing Sheets

OTHER PUBLICATIONS

Advances in Instrumentation, vol. 42, Part 2, ISA, (Research Triangle Park, NC,US), P.P. Off: "Human Interface Techniques for Real–Time Global Data Base Access," pp. 883–890.

Electronic Design Article entitled "Software Package Lets PC Control Instruments With A Touch," Oct. 31, 1984, pp. 180–194.

Electronics Review, "System For Terminals Created Keyboards' Anyone Can use," Jun. 5, 1980, pp. 39–40.

IEEE Communications Magazine article entitled "An Interactive Touch Phone For Office Automation," vol. 23, No. 2, Feb., 1985, pp. 21–26.

Computerworld article entitled "Standing Up For The Touch Screen," Jul. 23, 1984, pp. ID/1–ID4.

Product Bulletin entitled "Fluke 1020 Series Touch Control Screen," John Fluke MFg. Co., 1986.

Cybernetics and Systems Research, "A Frame–Based Real–Time Graphic Interaction System," Horn, et al., 1984, pp. 825–830.

Control Engineering article entitled "Control Panels: From Pushbuttons to Keyboards to Touchscreens," W. Raymond Flynn, Jun., 1984, pp. 79–81.

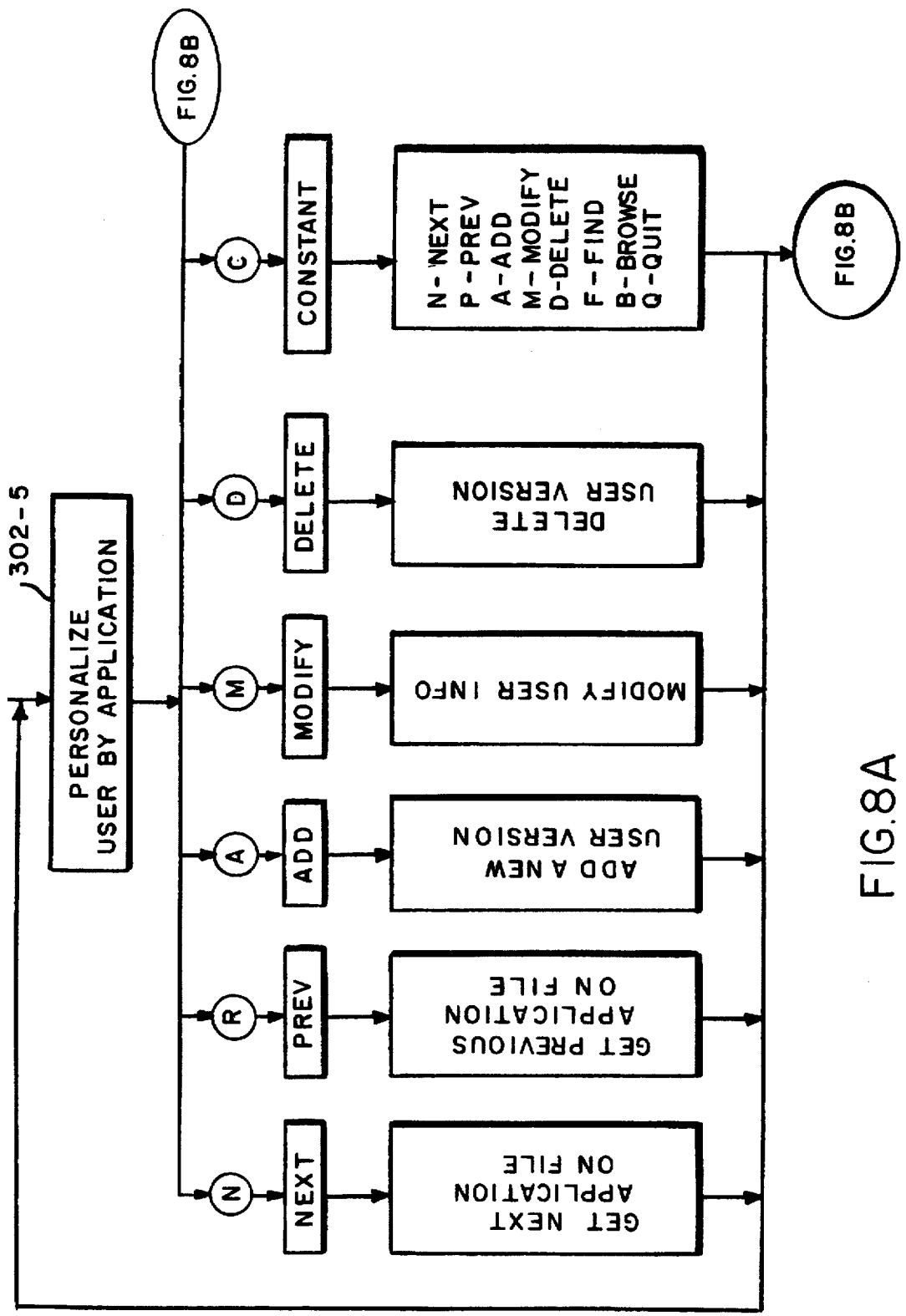

FIG. 12A

LAS VEGAS POLICE DEPARTMENT

WESTERN STATE:

| NEVADA | CALIFORNIA | ARIZONA | UTAH | WASHINGTON |
|---|---|---|---|---|
| IDAHO | NEW MEXICO | COLORADO | WYOMING | OREGON |
| TEXAS | OKLAHOMA | KANSAS | NEBRASKA | SOUTH DAKOTA |
| NORTH DAKOTA | LOUISIANA | ARKANSAS | MISSOURI | IOWA |
| MINNESOTA | WISCONSIN | ILLINOIS | TENNESSEE | OTHER |

ANSWER | NEXT | PREV | QUIT

FIG. 12B

VEHICLE

TAG NUMBER:

TAG YEAR: 89 OTHER

VEHICLE YEAR: 1989 1988 1987 1986 1985 1984 1983 OTHER

MAKE:
MODEL:
COLOR:

ANSWER | NEXT | PREV | QUIT

FIG. 12C

VEHICLE

TAG NUMBER: DRT 7Y7    TAG YEAR: 89    OTHER

KEYBOARD    LIBRARY

| 1989 | 1988 | 198 |   |   | 84 | 1983 | OTHER |

MAKE:
MODEL:
COLOR:

| ANSWER | NEXT | PREV | QUIT |

MAKE: B.M.W.
PAGE: 1

| B.M.W. |
| BUICK |
| CHEVY |
| CHRYSLER |
| DODGE |
| FERARRI |
| FORD |
| G.M.C. |
| HYUNDAI |
| JAGUAR |
| LAMBORG |
| MERCEDES |
| MERCURY |
| NISSAN |
| OLDS |
| PLYMOUTH |
| PONTIAC |
| ROLLS R. |
| TOYOTA |

PICK
MOVE
CANC
PGUP
PG DN
HOME
HELP

[Infraction]  Infraction code  A-001
Page : 1

| CODE | DESCRIPTION | FIN |
|---|---|---|
| A-001 | Time Limit | 35 |
| A-007 | Parking more than 72 hours same location | 35 |
| A-008 | Parking more than 1 hour on public road | 35 |
| A-021 | Parking with key left in unattended car | 35 |
| A-030 | Parking over 12 hours on city property | 50 |
| A-101 | No parking signs | 10 |
| A-102 | No parking - movable signs | 10 |
| A-103 | No parking - bus zone | 35 |
| A-117 | Parking against traffic | 35 |
| A-105 | Parking in front of sidewalk ramp | 10 |
| A-106 | Parking in handicap zone | 50 |
| A-107 | Parking less than 6.5 feet from hydrant | 50 |
| A-108 | Parking within 26 feet of street corner | 10 |
| A-116 | Not parallel-parked to sidewalk | 10 |
| A-104 | Parking on sidewalk | 10 |
| A-121 | Parking on hill without wheels turned in | 10 |
| A-123 | Parking in reserved locations | 35 |
| A-125 | Illegal parking in parks | 10 |

[PICK] [MOVE] [CANC] [PgUp] [PgDn] [HOME] [HELP]

FIG. 12F

PORTABLE COMPUTER WITH TOUCH SCREEN AND COMPUTING SYSTEM EMPLOYING SAME

This is a continuation of U.S. patent application Ser. No. 08/098,219, filed Jul. 28, 1993, now U.S. Pat. No. 5,379,057, which is a continuation of U.S. patent application Ser. No. 07/890,311, filed May 26, 1992, now abandoned, which is a continuation of U.S. patent application Ser. No. 07/731,375, filed Jul. 16, 1991, now abandoned, which is a continuation of U.S. patent application Ser. No. 07/271,237, filed Nov. 14, 1988, now abandoned.

FIELD OF THE INVENTION

The present invention relates to personal computing using a portable computer having a built-in touch sensitive screen as a combined input/output device, and to computer systems using such computers for remote data collecting and recording.

BACKGROUND OF THE INVENTION

Portable devices for data collection at locations remote from central facilities are now commonly available and becoming common place. These devices include hand-held units and lap-top computers. Hand-held data collection devices typically run dedicated, often, single-function applications which are pre-programmed for specific end uses in specific fields, e.g., traffic citations and inventory taking. Usually data is entered into the hand-held device by bar code readers or keyboards, or a combination of the two. While data entry by bar code reader can be effected swiftly, keyboard data entry frequently bogs down due to the lack of operator skill and need to enter the data letter-by-letter, number-by-number, bit-by-bit.

Furthermore, typical hand-held devices have limited display screen sizes and limited operating programs. They utilize small memories, ROM and/or RAM, in which the collected data is stored until it can be uploaded to a host computer by direct cable connection or modem. The specific application which the hand-held unit is to run typically is stored on-board in RAM.

On the other hand, lap-top computers typically are general-purpose machines which are not application-dedicated. Frequently, lap top computers' display screens are full size or nearly full size, unlike the hand-held units, and usually flip up for use. Entry of information is generally performed using a keyboard which is provided integrally in the lap-top computer's housing or as a peripheral, although other peripheral input devices such as a mouse or touch screen can also be used. Because the lap-top is intended for use while supported on the user's lap, as the name imports, use of a mouse or touch screen is difficult to coordinate or even precarious. In addition, the typical lap top computer's physical characteristics, including its unsymmetrical dimensions, bulkiness, weight, and off-set center of gravity, make use of the lap-top computer unwieldingly in many instances.

For both hand-held devices and lap-top computers, the need to use a keyboard for entry of data is viewed by many would-be users as being laborious or tedious or requiring a skill they have not mastered. This is particularly true for those individuals who are not office workers and have little or no typing skills or who have little or no experience with computers. The computer keyboard can be an intimidating device for them, all the more so when confronted by the traditional typewriter-type QWERTY keyboards.

Also known are systems of point-of-sale ("POS") terminals for use for such diverse purposes as grocery check-out at supermarkets, inventory control, credit authorization or verification or electronic fund transfer. In such systems, the input terminals typically are off-line devices operating limited programs mainly for arithmetic operations, using a keyboard bar code reader or other data entry devices to capture the data for uploading to a central processing computer. Furthermore, such POS terminals typically are disposed for use at fixed locations and, consequently, do not afford the convenience of portability for many applications. Portability or even ambulatory use is more than a convenience—it is a necessity.

SUMMARY OF THE INVENTION

Accordingly, it is an object of the invention to provide an improved, portable, general purpose computer which permits facilitated data entry, is ergonomically designed in a streamlined case with an integral touch screen for over-all ease of use and economy of effort, and is not unwieldy for the user on the go.

It is yet a further object of the invention to provide an improved system for data collecting and recording which is straight-forward to use for the "man-in-the-street", i.e., requires minimal instruction for use, and requires reduced use of a keyboard for entry of information and data.

It is another object of the invention to provide such a system which also facilitates the process of data collecting and recording, for instance, replacing tedious report writing with a series of simple, speedy, single-stroke entries to choose responses from sets of multiple-prescribed answers that change, when necessary, so that the answers in the sets conform to the nature of the question at hand.

Other objects of the invention will in part be obvious and will in part appear hereinafter.

The invention accordingly comprises the features of construction, combination of elements, and arrangement of parts which are exemplified in the construction hereinafter set forth, and the scope of the invention will be indicated in the appended claims.

Briefly, according to a first aspect of the invention, an improved portable computer is provided which is specifically adapted for facilitated data collection and recordation. The portable computer is self-contained in that it includes in a single compact housing all components necessary for computing—a CPU, memory, input/output device, a battery pack for power, and preferably, a floppy disk drive or RAM pack.

The input/output device has a touch sensitive screen superposed over a display, for example, an LCD display. The display is visible, and the touch sensitive screen is accessible, through a window defined in the housing. The portable computer is keyboardless in that it does not require a keyboard for use since it is equipped with the touch screen. Nevertheless, it is provided with connections to hookup an external keyboard as well as a full range of peripherals, and is capable of displaying an interactive, simulated keyboard by means of the input/output device.

For data collecting and recording, the memory stores a data collection application and has locations for storing data entered manually by touching the touch sensitive screen. The data collection application determines the content and format of displays, and can be generated or created on the portable computer or another suitable computer using an external keyboard and cursor control.

The CPU executes the application and processes the manually entered data pursuant to the application.

In accordance with other aspects of the invention, the processor, memory and input/output device of the portable computer cooperate to provide multiple choice questions, multiple choice/multiple-selection questions, simulated keyboards, sliding scales and libraries to appear on the display at appropriate times as data entry devices.

In accordance with still other aspects of the invention, data collection is facilitated by using displayed help fields for each question or subject, sequential and consequential libraries, and cross-referencing of entered responses. These features offer particular advantages in expert systems, such as medical diagnostic applications.

Sequential libraries are libraries of possible responses in text or pictogram form stored in fields in memory and fetched with the associated subject or question for display in single column or multi-column format on the display of the input/output device. The user then selects one or more of the listed possible entries by suitably touching the touch screen. The input/output device generates response signals corresponding to each selected response. The CPU causes data corresponding to the response signals to be stored in memory. Preferably, the user can personalize the contents and order of the displayed library entries.

Consequential libraries are similar to sequential libraries except that associated with one or more of the possible responses stored in the memory, are actions or executable instructions (e.g., branch, jump, etc.) also stored therein which change the flow of the application. The user selects from the displayed possible responses as described with respect to sequential libraries. The selection results not only in data being stored in memory, however, but also in the CPU executing the action associated with the selected response.

Cross-referencing entails the matching of entered responses with a library of possible responses, and, if a match is encountered, displaying the fact of the match, otherwise alerting the user, or displaying information stored in memory fields associated with that library entry.

In accordance with still other aspects of the invention, the display can be personalized to a particular user, can be used to perform spread sheet calculations, can be programmed to have constant fields of information, and can be modified to promote or rearrange specific subjects or questions.

In addition to the foregoing, the invention embraces a data collection method and system characterized by the above-identified features, and providing facilitated data collection in the field. Such a system includes a host computer for generating the application, and a plurality of satellite computers, each advantageously being one of the portable computers described above, for executing the application received from the host computer, collecting and recording data pursuant thereto, and from time to time, up-loading the collected data to the host computer for further processing and/or storage.

Along these lines, the invention takes advantage of the attributes of the portable computer by providing a carrying case and strap arrangement for holding the portable computer and suspending it from the body of an ambulatory user at a suitable location and orientation of use.

BRIEF DESCRIPTION OF THE DRAWINGS

For a fuller understanding of the nature and objects of the invention, reference should be had to the following detailed description taking in connection with the accompanying drawings, in which:

FIGS. 8A and 8B are detailed block diagrams of the PERSONALIZE function of FIG. 6;

FIGS. 12A through 12F are illustrative screen displays of a parking infraction application generated by the application generator of FIG. 5 and executed on the satellite computer of FIG. 4A by the run-time program of FIG. 11;

DESCRIPTION OF THE PREFERRED EMBODIMENT a. Portable Computer

Figure 1:
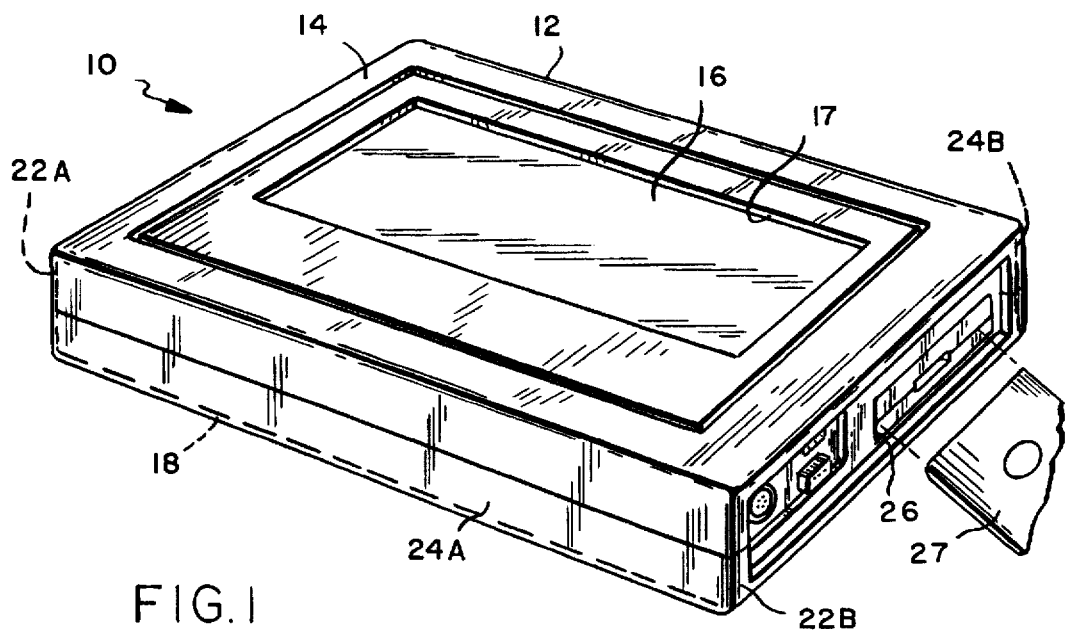
FIG. 1 is a perspective view of a portable computer in accordance with the invention.

FIG. 1 is a perspective view of a portable, general purpose computer 10 of improved design in accordance with the invention. The portable computer 10 is of compact design, e.g., being 13¾×9½×2¼ inches in size and weighing only 7 lbs. As illustrated, a computer housing 12 is provided, of boxlike form having a generally rectangular, planar top surface 14 incorporating a substantially flush-mounted input/output screen 16. The input/output screen 16 has a liquid crystal display (LCD) with a touch screen overlay.

As illustrated, the input/output screen 16 is visible and accessible through an opening or window 17 in the housing, is of generally rectangular form, and comprises a substantial portion of the area of the top surface 14. For example, in one configuration, the top surface 22 has outer measurements of 12.75 inches by 9.5 inches and the input/output device 24 has measurements equal to that of the housing window 28, i.e., 9 inches by 4 inches. As such, approximately 30% of the top surface consists of the input/output device 16. In other configurations, this ratio can be as high as, e.g., approximately 40%, with just a minimal case border surrounding the screen 16.

As illustrated, the housing 12 also has a bottom wall 18 parallel with the top surface 14, and substantially parallel left and right sides 22A, 22B, and substantially parallel front and back sides 24A, 24B, respectively. Accessible through the right end 24B is a disk drive 26, e.g., for accommodating a 3.5 inch floppy diskettes 27, and a plurality of connectors 38 for connecting peripherals (not shown in FIG. 1).

Figure 2:
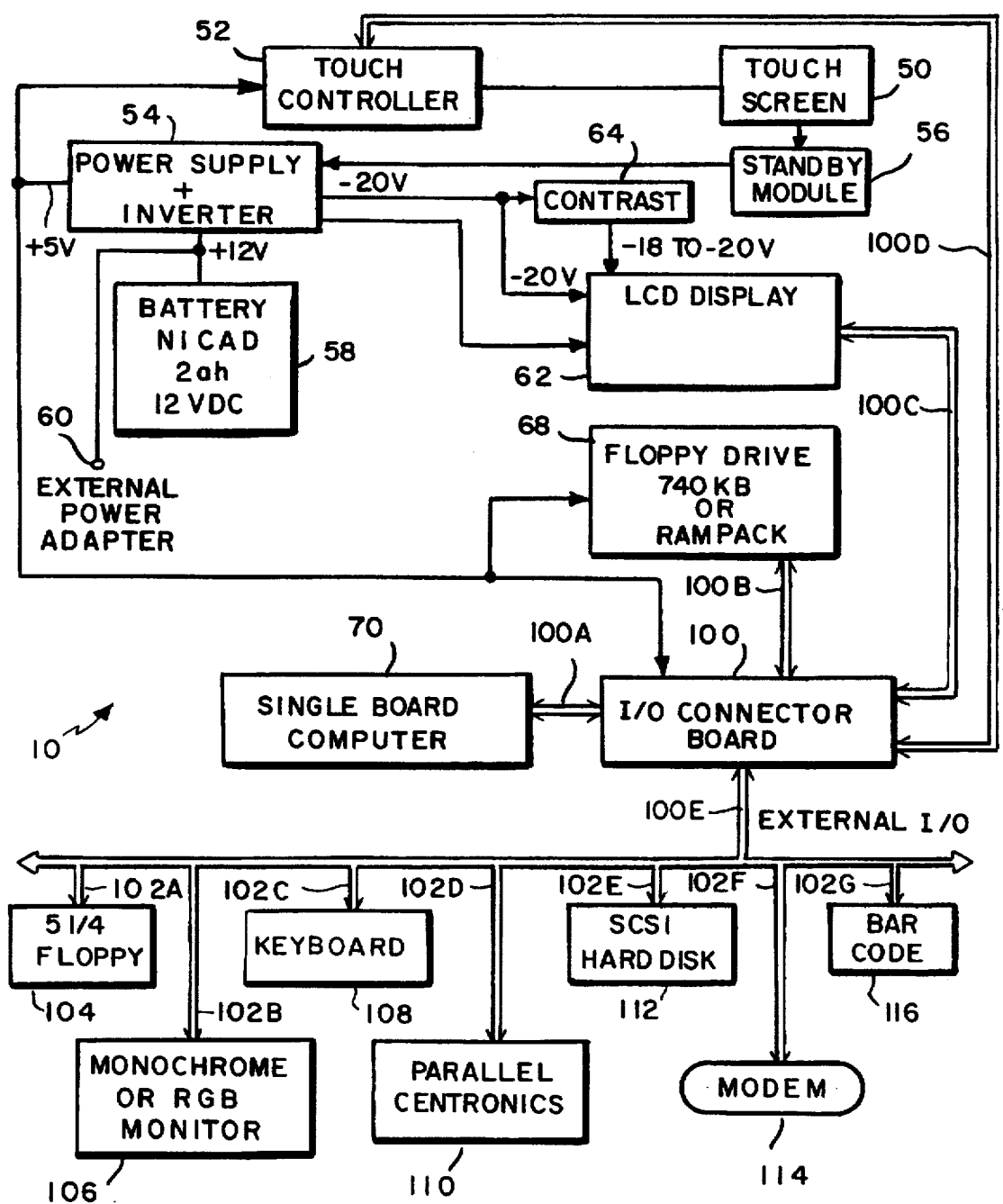
FIG. 2 is a block diagram of the components of the portable computer of FIG. 2, together with selected peripheral devices.

FIG. 2 shows a block diagram of the portable computer 10. Block 50 represents the previously mentioned touch screen. Suitable touch screens 50 are commercially available, e.g., from ELOGRAPHICS, Oakridge, Tenn. A touch screen controller 52 electrically is connected to the touch screen 50 for controlling the touch screen 50. Suitable touch screen controllers 52 are commercially available from MEGATEL Corporation.

A power supply unit and inverter represented by Block 54 supplies all current for the computer 10. There is a standby module 56 for bringing down parts of the portable computer 10 for power savings, which is connected between the touch screen 50 and the power supply and inverter 24. Block 58 represents a battery pack which, for example, is a 12 volt DC, two amp-hour, NiCad pack for supplying power to the computer 10. The battery pack 58 is disposed in an externally assessable battery compartment (not shown). An external power adapter jack 60 is also provided for connecting the computer 10A–10N to an external power supply, e.g., 110 volts, during prolonged office use or as a back-up to the battery pack 58. Block 62 represents the LCD display which is a backlit, 640 by 200 width display (i.e., 200 rows of 640 pixels each), or a 640 by 400 width display for improved graphic resolution. Suitable LCD displays 60 are commercially available, e.g., from OPTREX Corporation, California. The LCD display 62 is connected to the power supply and inverter 58 to receive –20 V DC and 120 VAC at 400 HZ, and to a contrast control 64 for controlling the contrast of the display. The contrast controller 58 receives –20 V DC from the power supply and inverter 54 and supplies –16 to –24 V DC to the LCD display 62 as manually selected by turning a control knob (not shown) on the outside of housing 12.

Block 68 represents a drive for a user-transportable read/write memory device such as floppy disk 27 (FIG. 1), or a receptacle with electrical connectors for a RAM pack (not shown) which both serve the purpose of storing an application to be run.

Figure 3:
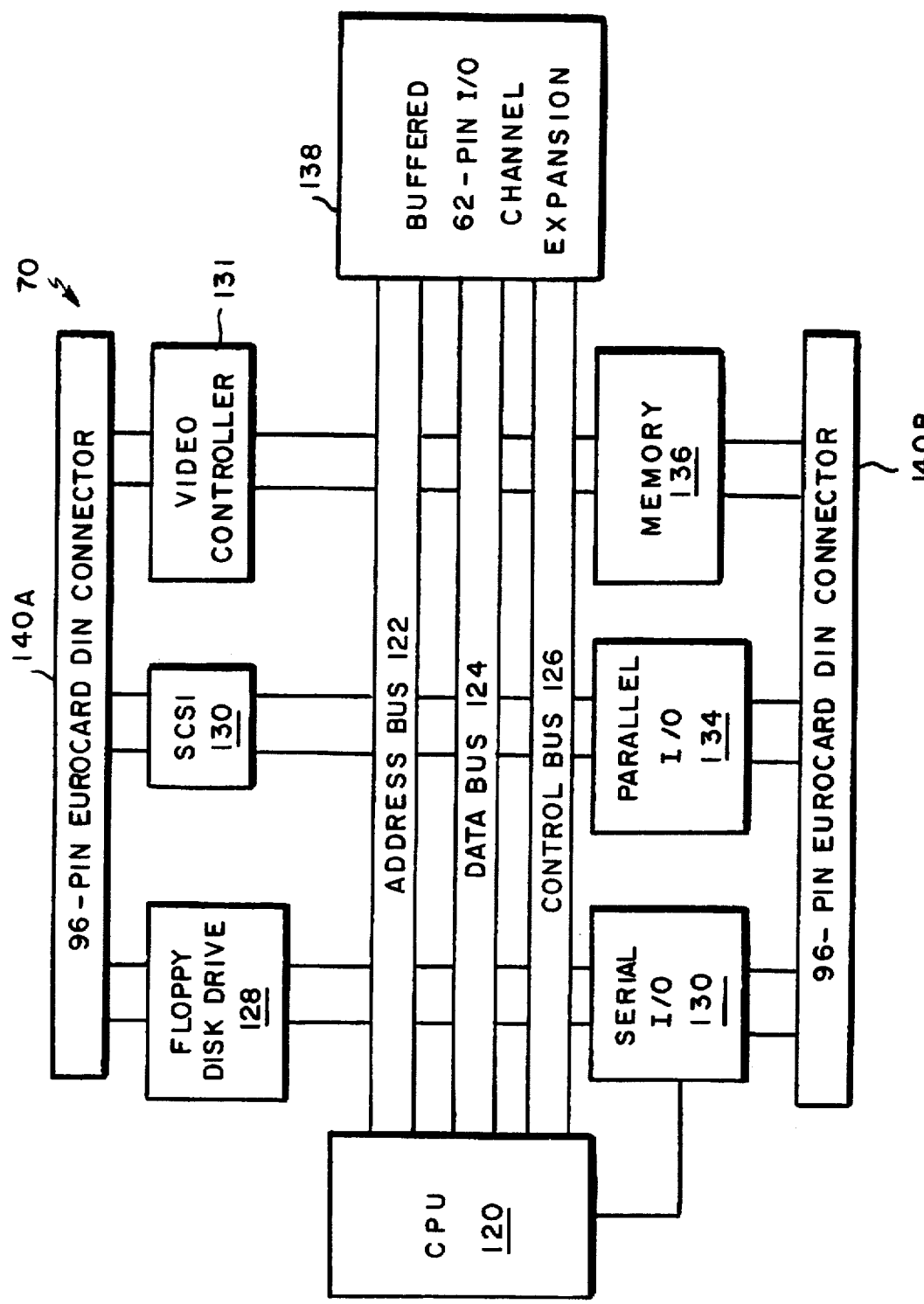
FIG. 3 is a block diagram of the components of a single-board computer of the portable computer of FIG. 2.

Block 70 represents single-board computer which controls all the other components illustrated in FIG. 3. Suitable single-boards computers 70 are commercially available, e.g., from MEGATEL Corporation, Weston, Ontario. Preferably the single-board computer 70 is of compact design, for example, 6 inches×4 inches. It will be described in more detail shortly.

An input/output (I/O) connector board 100 links the single-board 70 computer to all the I/O devices and components and controls therefore found within computer 10, including the touch screen 50, touch controller 52, LCD display 62 and drive 68. Suitable I/O connector boards 100 are commercially available, e.g., from MEGATEL Corporation. A plurality of bi-directional buses extend from the connector board 100. A main bus 100A connects the single-board computer 70 with the I/O connector board 100. From the I/O connector board 100 extends a bus 100B which ties in the single-board computer 70 to the floppy disk drive 68. An LCD bus 100C connects the LCD display 62 with the single-board computer 70. In addition, a touch screen controller bus 100D connects the touch screen controller 52 to the single-board computer 70. Finally, an external I/O connector bus 100E connects the I/O connector board to various input and output lines 102A–102G, each of which permits the connection of a peripheral device. As shown, line 102A permits connection of a second drive 104, e.g., for a 5¼ inch floppy disk, line 102B permits connection of an external monochrome or red-green-blue ("RGB") monitor 106. Line 102C is for a communication line or hook-up to a keyboard 108. Line 102D is for connection of a parallel-type printer 110. Line 102E is an external SCSI interface for hooking up an external hard disk unit 112. Line 102F is used to hook-up an external modem 114. Line 102G is used to hook-up a bar code reader 116.

Accordingly, it can be seen that portable computer 10 is a self-contained versatile machine for stand-alone operation under the control of its own processor, and/or integrated into a system for data collection.

FIG. 3 is a block diagram of the single-board, digital computer 70. There is shown a central processing unit ("CPU") 120, such as is available commercially from NEC Corporation. Within the CPU 120 there are DMA, timers, int. control registers, address decoders and serial I/O. From the CPU 120 extends several bi-directional buses: an address bus 122 distributes all the addressing information; a data bus 124 distributes all the data information; and a control bus 126 distributes the control information. Each of these buses 122–126 provide electrical communication to other components of the single-board computer 70. A floppy disk drive interface 128 handles any of a variety of sizes and types of floppy disks, e.g., 3.5 inch and a 5¼ inch diskette, whether of 300K, 720K or 1.2 meg density. A SCSI 130 hard disk and tape back-up interface is also provided for communication with peripherals. A video controller 131 allows the connection of various display devices, e.g., color graphics display, LCD display, etc. A Serial I/O communication ports 132 is available for modem connection or other serial transmission to a host computer. There is a parallel I/O communication port 134 used to connect a parallel printer. A memory 136 is provided, preferably 512K or 768K of RAM memory and 8K of ROM for maintaining the operating system. The address, data and control buses 122–126 are directed to a buffered 62 pin I/O channel expansion 138, which accepts standard expansion boards 140A, 140B. There are also provided two 96 pin EUROCARD DIN connectors.

b. Data Collecting System

Figure 4A:
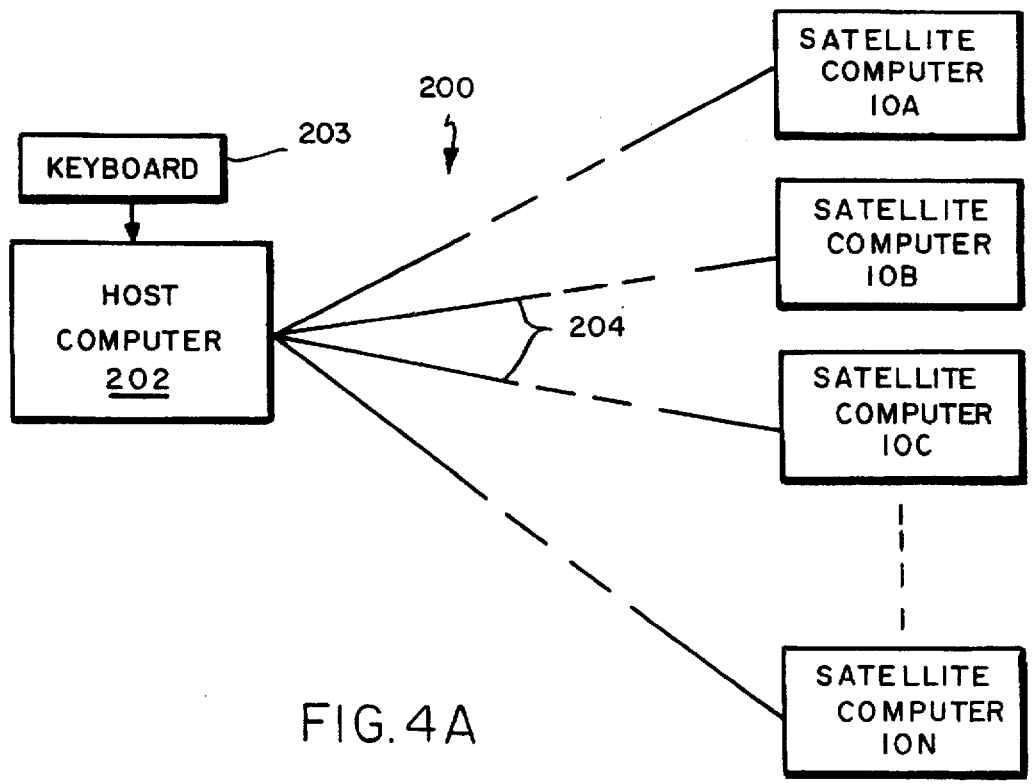
FIG. 4A and 4B are block diagrams of alternative data collection systems in accordance with the invention.
Figure 4B:
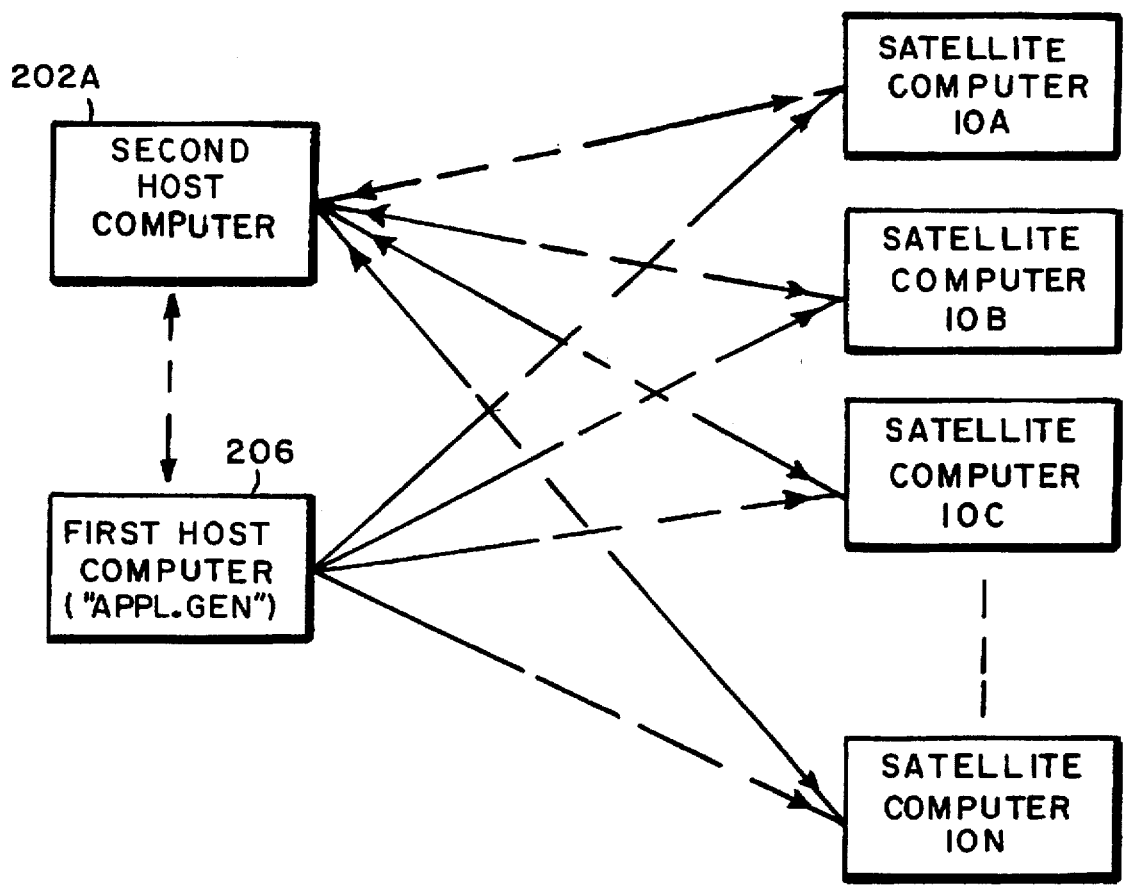

FIG. 4 illustrates a data collecting and recording computer system 200 in accordance with the invention which incorporates a host computer 202 and a plurality of computers 10A, 10B, 10C, 10D . . . 10N each of which advantageously being one of the portable computers 10 of FIGS. 1–3. Each computer 10A–10N is capable of running a data collecting and recording application independent of the other computers. The term "satellite" is intended to denote that the computers 10A–10N are normally used independently of the host computer 12 under the control of their own central processing unit ("CPU"), and are freely portable and mobilely usable. In other words, the satellite computers 10A–10N are intended to be used while being carried, for example, on the factory floor, about a construction site, or in the field, remote from an office. The satellite computers 10A–10N are only dependent on the host computer 12 for down-loading of an application therefrom to be run on the computers 10A–10N typically after communication with the host computer has ended, and for up-loading of data collected by the computers 10A–10N. As such, the computers 10A–10N are intended for use in an "independent mode" under the control of their own central processing unit during field data entry, i.e., when data is collected and recorded or stored therein, and in a "subordinate mode" for application receipt from, and collected data transfer to, the host computer 202. In normal use, the computers 10A–10N are in their subordinate mode during an insubstantial length of time of their use.

The host computer 202 is responsible for computer-assisted design of the data collecting and recording application to be run on the computers 10A-10N. The host computer 202 runs an application generator program which requires a keyboard 203, full screen with cursor, etc., by means of which the application designer designs application screen contents and formats for data collection. The application generator program is intended to work on any of a variety of host computers 202, such as the portable computer 10 with suitable peripherals or commercially available IBM brand or compatible personal computers, minicomputers or main frame systems, using a known operating system, preferably MS-DOS (trademark), which is available from MICROSOFT, INC. Once an application is designed by a host system 202 it is then downloaded to one or more of the computers 10A-10N.

The host system 202 stores an application and association libraries in memory locations partitioned by the application generator. The libraries are stored and indexed, for instance, by type, by user, or by company. A whole series of applications and associated libraries can be stored in the host computer 202, any of which being available to be downloaded to one of the computers 10A-10N.

Once the application is downloaded to the computer 10A-10N, the computer 10A-10N is ready to perform data collection. The satellite computer 10A-10N can continuously and repetitively collect data based on the screen content and format established by the application generator. The collected data is locally stored in the computer 10A-10N. When data collection is completed, for instance, once the work day is over, the data from the computer 10A-10N is uploaded to the host computer 202. At this point, it is up to the operator of the host computer 202 to use the transferred data for whatever purpose is desired. Appropriate routines are provided in the system 100 to do the upload directly into the host computer 202, preferably using commercially available databases.

The uploading or downloading between the host computer 202 and the satellite computers 10A-10N can be done in any of several ways—by user-transportable means such as a floppy disk, a cable attachable from the host computer 202 to the satellite computers 10A-10N whenever communication is to occur, or a temporary mordem connection, or other communication means. Again, this can be done through commonly available hardware and/or communication software. The up-loading/down-loading techniques are collectively illustrated by the dashed line designated 204.

Once the application is designed on the host computer 202 and downloaded therefrom to the satellite computers 10A-10N, the application is executed by a run-time program stored in the satellite computer 10A-10N. The satellite computers 10A-10N preferably use the same operating system as the host computer 202, and the run-time program is used to input data specified and formatted by the downloaded application designed by the application generator.

In normal operation, for instance, with the application stored on a floppy disk, the floppy disk 27 is inserted into the disk drive 26 of the satellite computer 10A-10N and the machine can be turned on. Then, the computer 10A-10N will go through its normal boot up process, which does internal verification to make sure all components are functional and automatically brings up the application, ready to use. The user at this time can start entering or correcting the appropriate data for that application and store the data in memory in the satellite computer 10A-10N. After all data is collected for that application or after a preselected period of time, the user transfers the collected data back to the host computer 202 where it is uploaded into a host database. The host computer 202 used to generate the application can be the same as the host computer onto which the gathered data is uploaded, or the latter can be a separate host computer used for data collecting and processing, for example, in operations within a manufacturing facility or other facility. As such, an application generating computer 206 is provided down-loading a designed application to either host computer 202A or to the satellite computers 10A-10N.

c. Data Collection Application Generator

Figure 5:
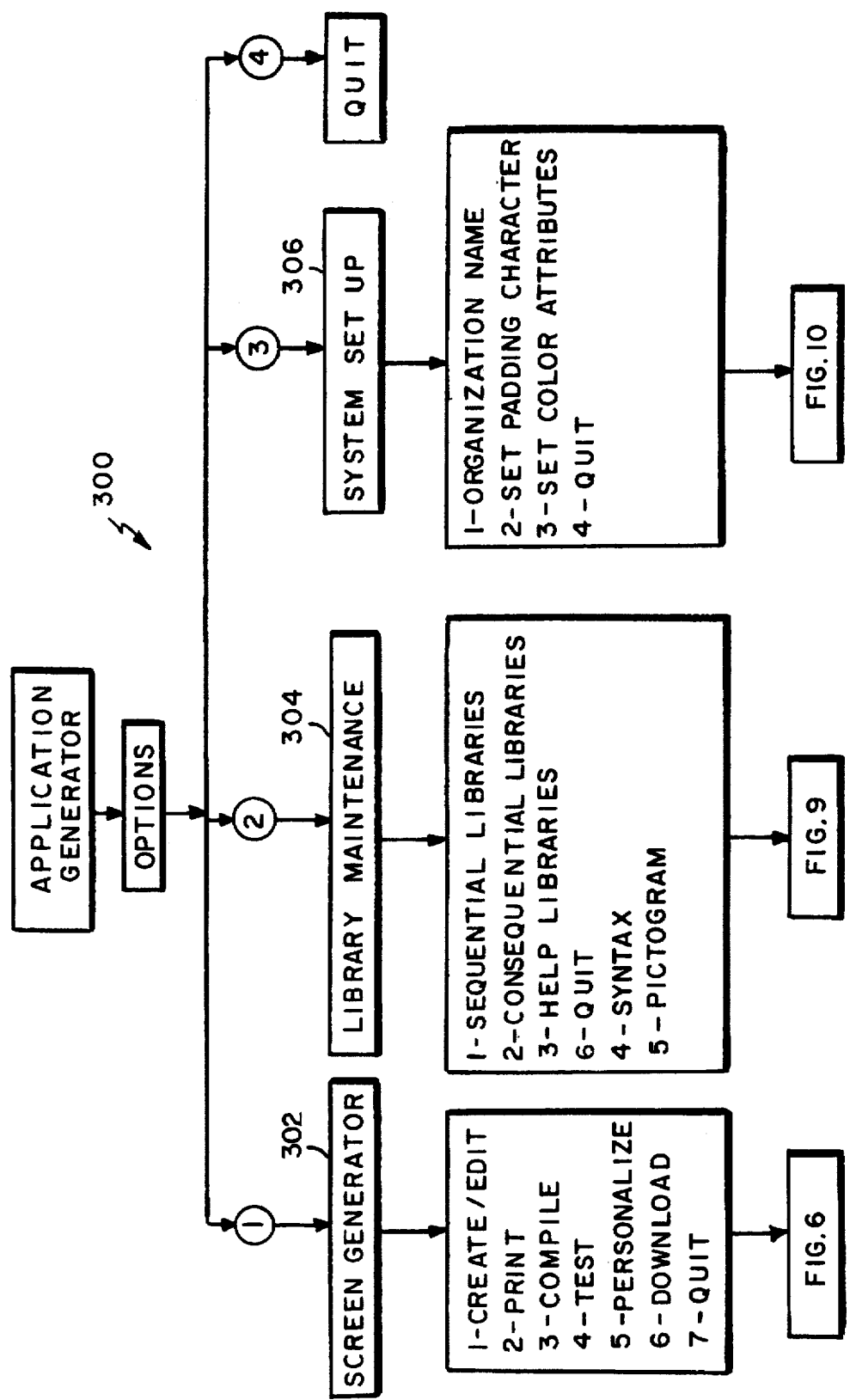
FIG. 5 is a block diagram of an application generator in accordance with the invention, by which the host compute of FIG. 4A generates applications for data collection.

FIG. 5 shows a block diagram of the computer-aided, interactive process 300 for application generation. The process is designed to provide a series of options which are selectable by the application designer. The computer 202 responds to the selection by implementing the selection and storing the result, or offering sub-options for further selection by the designer. This process repeats for each question/answer pair to be included in the application.

Of the several initial options in the application generator 300, a SCREEN GENERATOR 302 is used for designing and maintaining the data collection screens. It has seven sub-options: CREATE AND EDIT 302-1 which is used for actually creating and editing of the data collection screens; PRINT 302-2 which is used for printing out the content and layout of the data collection screens; COMPILE 302-3 is used to compile the data collection screens during down-loading to the computer 10A-10N; TEST 302-4 is used to test the validity of the data collection screen design, e.g., by using a test data collection problem to assure proper functionality; PERSONALIZE 302-5 is used for personalizing the data collection screen to a particular user; DOWNLOAD 302-6 is used to download the data collection screen and associated libraries to the computer 10A-10N.

Another option of the application generator is LIBRARY MAINTENANCE 304, which is used for creating and maintaining libraries which are pertinent to the data collection screen. Within this option are several sub-options: SEQUENTIAL LIBRARIES 304-1 is used to create sequential library, which are lists of information; CONSEQUENTIAL LIBRARIES 304-2 is used to create consequential libraries, which are lists of information similar to sequential libraries, but having actions associated with one or more entries in the list. HELP LIBRARIES 304-3 are libraries that are maintained for each question which give the user a further explanation of the question or the nature of the answer being sought.

The next option of the application generator 200 is SYSTEM SET-UP 306. Within SYSTEM SET-UP option 306 are again multiple sub-options: Organization Name 306-1 inserts the name of the company for which the data is being collected, Sub-option 306-2 is used for setting the padding character, i.e., the character that shows up in the answer field of the data collection screen, e.g., a full block character, a period, etc., set-up 306-3 allows the setting of the color attribute for the application, i.e., the color sets showing up on the screen at different areas of the application.

Figure 6:
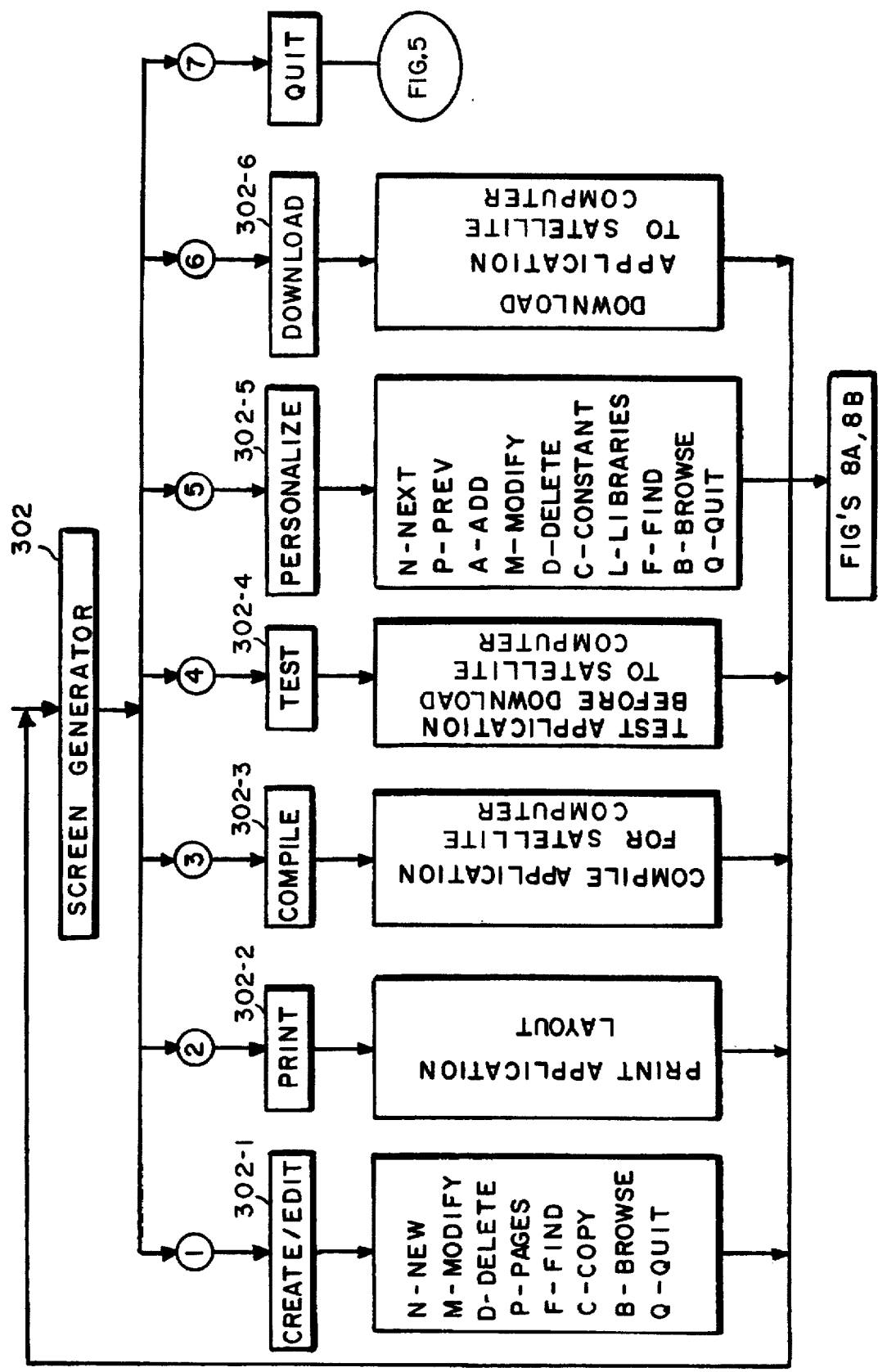
FIG. 6 is a detailed block diagram of the screen generator of FIG. 5.

FIG. 6 is a detailed representation in block diagram form of the screen generator 302 of FIG. 5. Of the sub-options 302-1 through 302-6 described above, only those offering multiple user-selectable functions need to be further described in more detail.

CREATE AND EDIT 302-1 includes NEW which creates a new data collection screen, MODIFY which modifies a current data collection screen which is on file, DELETE which deletes a data collection screen which is currently on file, PAGES which designs the data collection screen with a full page editor. FIND which finds a specific data collection screen that is currently on file and brings it up for display.

COPY which copies from an existing data collection screen into a new data collection screen, and BROWSE which lists the files of all data collection screens available for selection of an appropriate one for calling.

PERSONALIZING 202-4 offers NEXT which gets the next data collection screen on file in memory, PREVIOUS which gets the previous application on file, ADD which adds personalized information to a specific screen on file, MODIFY which modifies personalized information to a specific screen on file, DELETE which deletes personalized information on a screen on file, CONSTANT which inserts constant information that will always show on-screen regardless of the data gathered during execution of the application, LIBRARIES which personalizes a library for a specific user, FIND finds a personalized screen for a user on file, BROWSE lists all personalized screens on file for selecting of an appropriate one.

Figure 7:
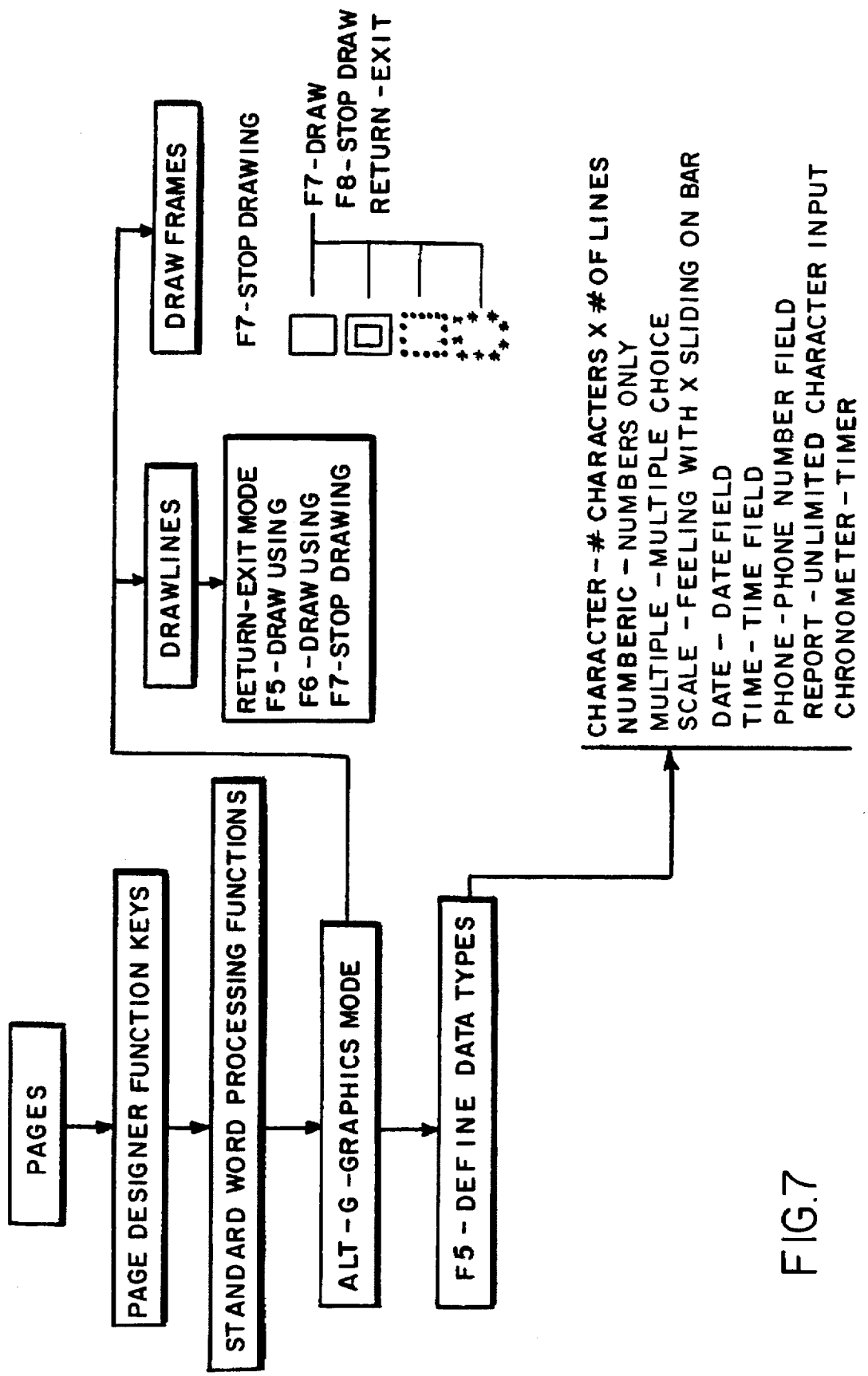
FIG. 7 is a detailed block diagram of the PAGES function of FIG. 6.

FIG. 7 illustrates the devices available for the design of data collection screens using a page designer based around the standard word processing functions found in commonly used word processors, including a page editor with full cursor control. In addition, there are certain functions which are specific to the invention and will now be described. Alternate G is the GRAPHICS MODE. The GRAPHICS MODE is important for creating data collection screens, by controlling the drawing or painting on screen of a line or a frame. If the line option is selected it allows the drawing of lines on the screen using cursor control, either a full line or a dash line, in the appropriate direction. The DRAW FRAME allows the drawing of boxes or touch points or buttons on the screen. These, again, are user selectable, and disposable on screen at whatever location is desired. Boxes are mainly used in designing multiple choice questions. Alternate LOOP DEFINITION allows the defining of a looping structure on the data collection screen. For example, when using a data collection screen, questions one, two, and three can be sequentially answered, and then question four, five and six form a loop meaning that these questions require sequential responses that have to be repeated in sequence.

The F5 MODE offers several alternative data types, i.e., the nature of the answer or data to be entered, including character, numeric, multiple-multiple choice, etc. It also establishes the input type, indicating where the information will be coming from, such as a library, electronically simulated (QUERY or Alphanumeric) keyboard appearing on the touch screen, or scale (i.e., an "x" or other character sliding on a bar in response to touching the touch screen), etc.

More specifically, character data types basically involve straight character input. The length of the screen is defined, i.e., the number of characters by the number of lines that the user is allowed to input for a particular answer. NUMERIC INPUT allows entry of numbers only. The MULTIPLE CHOICE ANSWER function can be defined in two ways. First, a single response can be selected from a finite list of possibilities displayed on the screen. Second, MULTIPLE-CHOICE, MULTIPLE-SELECTION permits multiple responses to be selected from a series of choices given to the user on the screen. SCALE can be considered suitable for a "gut feeling" answer. A scale or bar graduated, for example, from 1 to 10 has a movable marker which moves in response to movement of a user's finger across the bar. This is particularly useful in opinion-oriented answers, such as "Do you like . . . ". A date field, a time field a phone field, and a report field (essentially similar to the character field except it allows for unlimited text input) are also provided. Finally, chronometer time field, is used in designing data screen applications that deal with sports or operational efficiency applications, for example, for timing lapse.

After defining the DATA TYPE, the INPUT TYPE selects the device to be used by the computer user when gathering data. There are four possibilities: 1) entering text on a keyboard (alphanumeric keyboard, QUERTY keyboard, or numeric keypad), 2) selections of entries from a sequential library, 3) selection of entries of a consequential library, and 4) selection entries from a file.

Figure 8B:
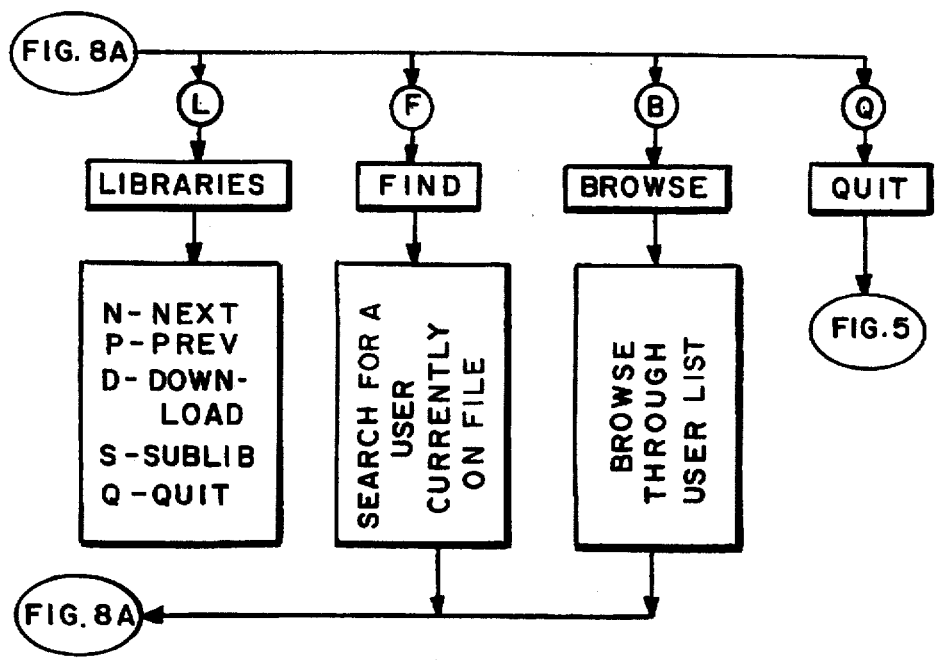

FIGS. 8A and 8B are more detailed block representations of the PERSONALIZE function 302-5 from FIG. 5, whereby an application is personalized for any user. There are several sub-options: NEXT which gets the next application on file, PREVIOUS which gets the previous application on file, ADD which adds a user to an application, MODIFY modifies the user information within that personalized application, DELETE which removes a user from that personalized application, CONSTANT which basically is a sub-function of the personalize option which allows constant information that does not change on an answer by answer basis to be continuously displayed on the data collection screen. Continuing on FIG. 8B, LIBRARY attaches libraries to a specific user's identification, i.e., stores the personalized libraries in memory locations indexed and accessible by user identification. In this way, the user will have available both personalized libraries, (that is, libraries which are only available to a selected user) and generalized libraries for the application that are automatically downloaded to all users. FIND searches through memory using user's identification, and brings up the personalized information for that user. BROWSE lists the personalized files for all users for selection of the appropriate one to call-up to screen.

The CONSTANT option deserves further explanation. It includes several sub-options, including NEXT which permits entry into the next constant field for a selected user, PREVIOUS which calls up the previous constant field for a selected user, ADD which adds a new constant for a selected user, MODIFY which modifies a constant field for a selected user, DELETE which removes a constant field for a selected user, FIND which allows us to find a constant field for a selected user and brings it up on screen, and BROWSE which lists constants for a selected user.

To simplify data entry by the computer user, the application designer or the user can display constant information for each one of the answers on the data collection screen—i.e., information which always remain the same for all screens. For example, in a parking infraction application, a policeman's name or badge number remains the same, so these answers can be identified as constants and automatically will come up on the all screens for the particular user/policeman. As such, the user need not enter that information repeatedly and these questions are jumped over during running the application, unless those constants are overwritten by the user.

The LIBRARY option of FIG. 8B allows the personalization of libraries for individual users. There are several sub-options, including NEXT which displays the next library for the selected user, PREVIOUS which displays the previous library for a selected user, DOWNLOAD which allows the marking of libraries for downloading for a selected user (i.e., as the libraries are being personalized on a user by user basis, the personalized diaries can either remain on file as dormant or can be marked to be downloaded for a selected user), "sublibrary" which displays personalized sublibraries for particular users (i.e., libraries can be nested one within the other with e.g., two levels of nesting permitted—the main library and personalized or general sublibraries beneath it).

Figure 9:
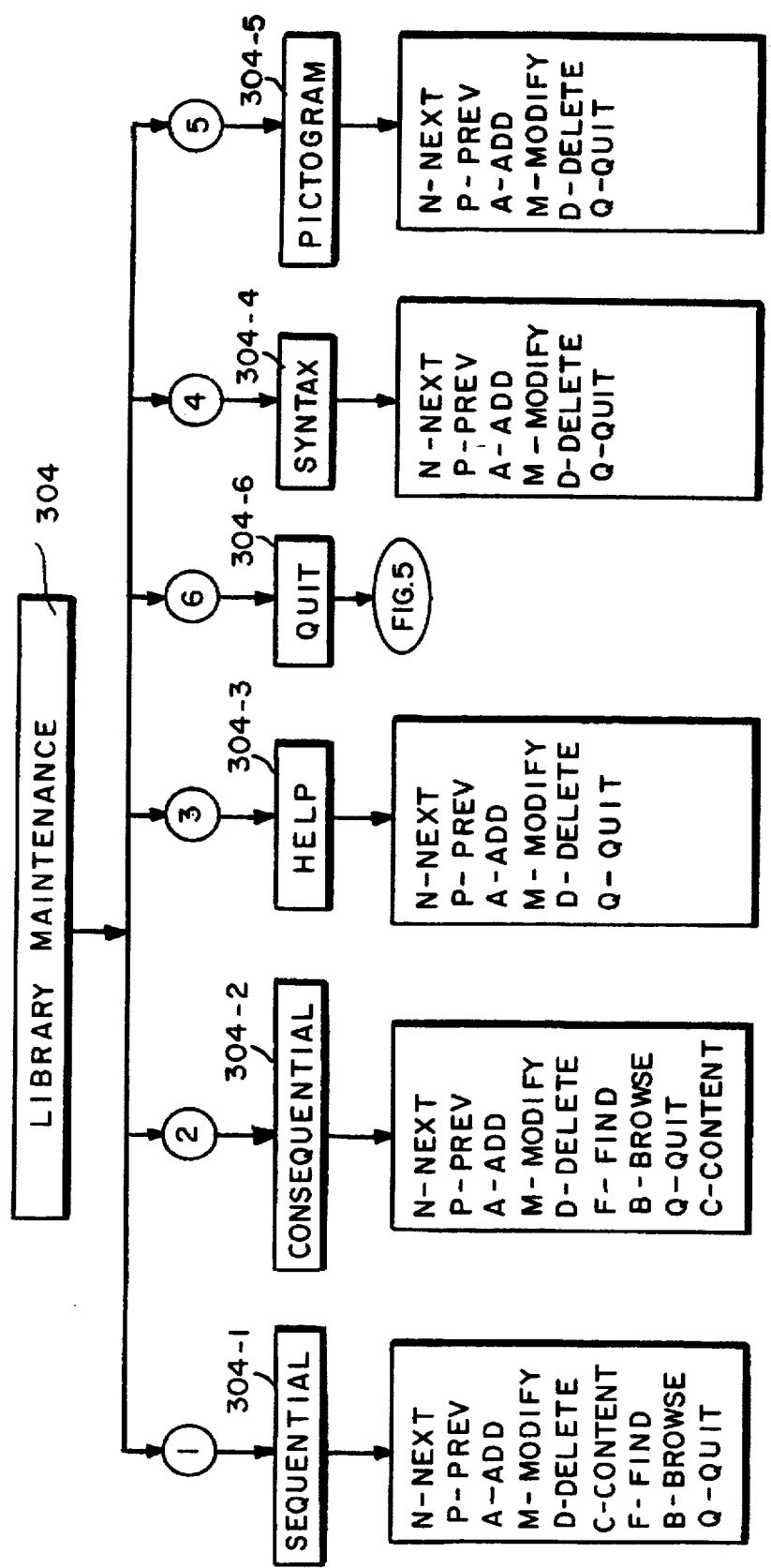
FIG. 9 is a detailed block diagram of the LIBRARY MAINTENANCE function of FIG. 5.

FIG. 9 further illustrates the LIBRARY MAINTENANCE option of the application generator of FIG. 5. This option involves the maintaining and updating of information in a library. Within library maintenance are several suboptions: sequential libraries, consequential libraries, help libraries, syntax libraries, and pictogram libraries.

The sequential library entails: NEXT which displays the next sequential library available on file, PREVIOUS which displays the previous sequential library available on file, ADD which allows the creation of a new library type to be added to the file, MODIFY which modifies a current library that is on file, DELETE which removes a library from file, CONTENT which adds and modifies the actual content of the information within the library (whether single column or multi-column libraries), FIND which finds a specific library and brings it up to the screen, and BROWSE which lists all libraries.

The subfunctions of the consequential libraries 304-2 are similar to the subfunctions found in the sequential libraries, except for the content.

Within CONTENT for consequential libraries of FIG. 9 there are two sets of fields, a data field for the data entry of the library similar to entry fields in the sequential library, and an extra field, which is an ACTION field. Based on the choice of a consequential library that is selected on the touch screen, the content of the data field will be loaded into memory as the answer to that question and the content of the action field for that entry will indicate a specific action for the computer to take based upon that selection, e.g., branch, jump, goto or loop. For example, the action may require answering questions 9 through 12 out of sequence. After the action is completed, the application typically returns to the next question after the one for which the consequential library entry was selected.

A further option is the HELP LIBRARY 304-3. HELP LIBRARIES are maintained and/or customized on a user or application basis. Within this option are suboptions which are analogous to those discussed above; i.e., "next", "previous", "add", "modify", "delete" and "quit".

The syntax library 304-4 also has analogous options to the help library, as does the pictogram library 304-5.

Figure 10:
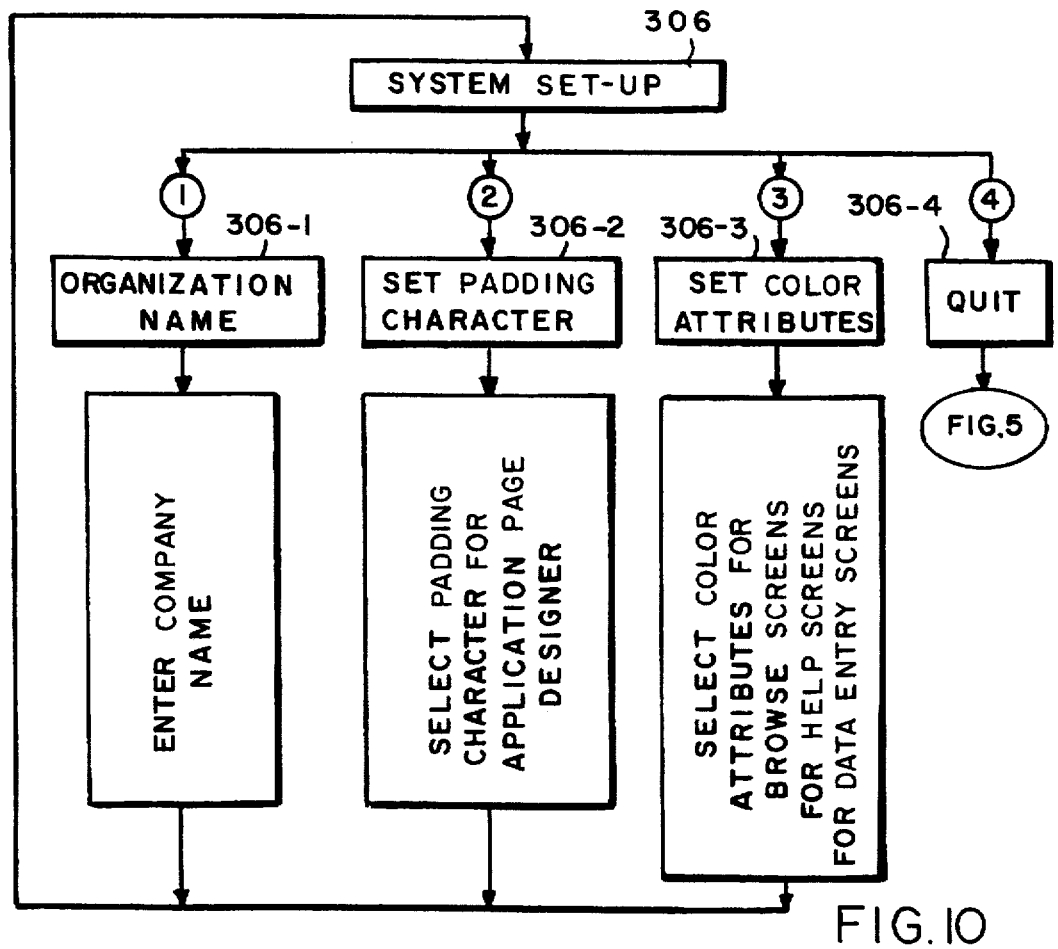
FIG. 10 is a detailed block diagram of the SYSTEM SET-UP function of FIG. 5.

FIG. 10 shows the SYSTEM SET UP options in greater detail. ORGANIZATION NAME 306-1 allows the application developer to enter the company name for which a particular application pertains. SET PADDING CHARACTER 306-2 defines the character that shows up on the answer field to indicate that input is required. The SET COLOR ATTRIBUTE 306-3 selects the color attributes for the browse, help and data entry screens found within the application generator.

d. Data Collection Application Execution

Figure 11:
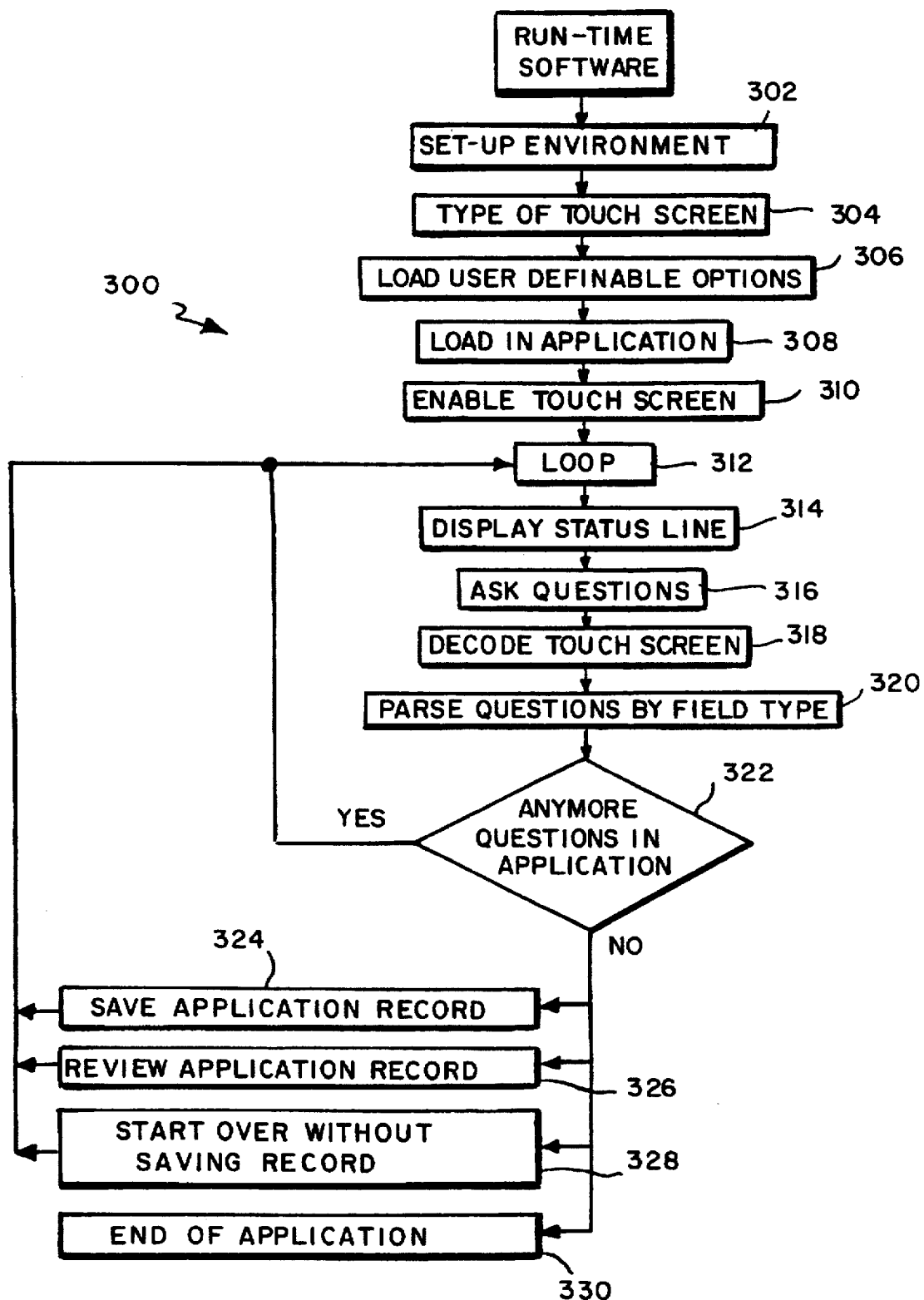
FIG. 11 is a flow chart of the run-time process for executing a data collecting application on the satellite computer of FIG. 4A.

FIG. 11 is a flow diagram of the run-time process 300 by which an application is executed. When the computer 10A–10N is turned on, automatically its operating system is loaded in and the run-time process commences. Upon starting of the run-time process, the first task is to establish environmental parameters (block 302), e.g., identify the type of keyboard the user has selected for use on the touch screen, whether sound should be activated on the touch screen, etc. "Type of Touch Screen", the next block 304, differentiates between the type of computer performing the application, i.e., whether it is a satellite computer 10A–10N, a host computer or other type. "Load Definable Option" (block 306) has several sub-options which are defined by the user himself. User definable options, for example, include the DOS path name under which the data is located on the disk. Another option is for automatic progressing through the application, i.e., after an answer or response is entered, the cursor either automatically goes to the next question or waits for the user to so indicate. The next block, "load in application" (block 308), loads in the application which the computer is to run. During this loading process, several steps are being done, for example, the application screen is being formatted, the answer information and answer types are loaded, including libraries, and looping information is also loaded. The next block deals with the touch screen. Here, the touch screen is enabled or activated to ready it to receive responses.

The next block starts the loop procedure 312. The loop procedure's main function is to go to each question on the data collection screen one by one, interact with the user to get the information, validate the information, and return to the beginning of the loop or exit. Within this loop there are several functions being done. The first block 314 is the "display status line". The status line is a displayed line with a plurality of electronic or simulated buttons (i.e., fields on the touch screen) that are activated by a touch on the screen. These buttons serve the purpose of controlling the flow of information within a data collection system. For example, a "next" button pulls up the next record that is in the computer, a "previous" button, and an "add" button that adds information or new data within the data collection screen. The "Ask question" block 316 displays a first subject for which a response is required, which is typically referred to as a question. On the first path, the question asked is the first one, on the second path it will be the second question, etc. (It should be clarified that this refers to the logical order, as opposed to positional order of the questions on the screen.

Once the question is responded to, or during the time the question is being responded to, the next block 318 decodes the touch screen to generate an electrical signal corresponding to and uniquely identifying the response, and block 320 parses the questions by type, i.e., determines whether the response is being entered through keyboard entry, through library entry (sequential or consequential libraries), through selection of multiple choice fields, etc.

Once the information is complete, the question is parked depending on the field type that was defined. Parking the question by field type basically takes the answer that was given by the user through the touch screen and verifies that it is a valid answer for that type of field, (e.g., character, numeric, multiple, etc.). Parking is done based on the type of field that was indicated at the time of application design, and if for any reason it does not match with what the user has punched into the touch screen, then the application loops for the correct information.

The next block, which is a decision block 322, checks to see if there are any more questions within the application. If there are more questions to be asked, it loops back, and goes through the loop again. If there are no more questions to be asked, i.e., all data collection screens in the job are totally filled in, then the user can decide on saving the data collected on the screen at that time (block 324), reviewing the data that was entered (e.g., to correct mistakes that have been entered) (block 326), or starting over without saving the record (i.e., the information is useless and should be cleared and redone) (block 328). The last block 330 in this decision is end of application. At this time the user can terminate the application.

e. Further Explanation of Selected Features

Certain features of the application generator and run time program will now be explained in greater detail.

(1) Consequential Libraries

The format or representation of consequential libraries on a data collection screen is essentially the same as a sequential library. The user does not see any difference between them. Both appear as lists of entries in a single column or multi-column form. However, within the run-time process there is a major difference—the consequential library includes data and action fields.

During the application design stage, the application designer can introduce an action attached to one or more entries, or, for that matter, each entry in a consequential library can have a corresponding action. When the user at the time of input on the touch screen selects a specific consequential library entry from the displayed list in the answer field on the screen, an action is returned with the selected entry. The entry is stored as data. The action is then decoded and executed. The action, for instance, can be a "goto", i.e., a jump to a separate screen to process a subcategory of questions related to that library entry. For this, when there is a downloading of the consequential libraries, a sequential list of library entries is downloaded along with the transfer of the associated actions to be executed during the run-time process. The action which is to be executed can also be in the nature of a loop or branch. When the jump or loop or branch is fully executed, then the system automatically returns to the next logical question after that consequential library entry was selected.

For example, where the question asks for an identification of sex, two possible answers are male or female. This could be on a library selection where "male" or "female" shows up on the screen. Subquestions may depend on the answer given to this question, i.e. subquestions for the male category, subquestions for the female category. These subquestions can be set out on separate screens, e.g., on screen number two and screen number three respectively (e.g., "What barber do you use?" can appear on screen number two, "What beautician do you use?" on screen number three) If the response "male" is selected, then the action associated with that entry, for example, would be to jump to screen two for responses to the subquestion related to the answer "male". Once that question is answered, the system automatically returns to the next logical question after the "identification of sex" question.

2. Help Function

Often in data collection systems, the help function is a short statement appearing on the beginning of the application, or explaining each type of answer and, e.g., being displayed on the bottom of each screen.

In the present invention there is provided a full text of user instructions for each question on the data collection screen. At the application design stage, the designer, for example, will prepare help messages or text relating to each one of the questions on the data collection screen. Anytime the user is inputting a response for a specific question, all the user has to do to obtain help is to hit the help button on the touch screen and, automatically, text will pop up on a window and explain, for example, what the nature of the answer should be, or the reason for the question on the screen.

3. Cross Referencing

Cross-Referencing imports that, for each answer field, the entered response can be related to a library to determine if the response in the answer field is existent in the library. In other words, the answer information is cross-referenced against that specific library. If it is available in that library, then, corresponding to that library entry, an action is executed. For instance, the associated action can involve an overlay window that alerts the user of the fact of the match with the library entry, or displays the contents of an information field stored in association with that entry in the memory. The user can then avail himself or herself of that information to make a decision or for whatever other purpose. Thus, cross-referencing results in the typical situation with the display of information.

4. Spread Sheet

This feature allows an application designer to set up a row/column data collection application on the run-time system. Typical usage of this would be, for example, in expense reporting for a salesman. In such an application, for example, across the top of the display is set forth each day of the week and down the left of the screen are is the different expense types to be reported, e.g., travel, meals, lodging. An expense can be entered into the appropriate column and row, for example, lunch on Wednesday. The dollar amount expended for that lunch is automatically tallied—it is added to the current amounts on a net window and is also totalled to the bottom or the right of the screen to show the total amount spent for lunches for that week. To do this, a spread sheet definition on the data collection screen is provided so that the system knows where to add or subtract the information from the collected cells of the defined matrix or array of possible entries.

5. Pictogram Library

The pictogram library is used to store graphical images of objects. A user can select from the pictogram library entries displayed on the screen in graphical images by touching the appropriate displayed pictogram entry.

6. Syntax Library

A syntax library allows the application designer or the user to change the syntax that is being used in the run-time process. Basically, run-time uses a pre-defined syntax which are standard messages that are displayed on the screen to interact with the user. The user or application designer might want to change these messages which can be done going into the syntax library by touching the appropriate button on the screen. The user or application designer can type the desired messages on the screen using a simulated keyboard display.

7. Constant Function

The constant function allows either the application designer or the user to set up certain answers on all screens—i.e., all screens pop up with certain information pre-set on them. This saves time in entering the constant data onto the screen. The constant information is tagged with and ID. This ID is used at the time of upload and download of the constant information. At download time, the user ID is read from the floppy disk or the RAM pack and all user personalized information is then transferred down to the floppy disk or the RAM pack. In the case of an upload, the same situation applies, if uploading information or data collected from the floppy disk or RAM pack into the host computer, the host system would verify or the upload program would verify the ID, upload the data collected and then, based on the ID, would verify if there were any changes done locally to the libraries on the satellite machine by the user. If there were local changes, e.g., new library entries or promoted information within the library, the ID would be used at upload time to update the libraries in the host computer to keep its libraries in par with those in the satellite machine.

8. Personalization

Personalization is a feature that allows us the user to personalize information that is pertinent to the specific user within the data collection screen. Once the data collection screen is designed it might be in use by multiple satellite computers in the field. It is always the same application data collection screen that is available to the user, but the libraries that pertain to that user can be personalized to account for differences in the area in which the user is working or the user's own preferences. The system designer or user personalizes the libraries. Among the benefits this offers is that the user is not overburdened with library information that is not needed by that user.

9. Multiple-Choice, Multiple-Section

The multiple choice questions are employed by conventional data collection devices. These questions seek and permit only a single response. The present invention employs a multiple choice/multiple selection questions. For example, in the restaurant business where a waiter or waitress is asking a customer for his food order, a multiple choice answer, might be hamburgers, hot dogs, soft drink, milk, coffee. The customer can select hamburger and coffee. All the selections are stored in fields corresponding to the single question being asked.

10. Miscellaneous Features of the Run-Time

These include library modification and promotability of entries on screen. Often in data collection application using libraries of possible responses there are more commonly selected library entries. For example a multiple page library may have entries on page three which are usually selected. It becomes a burden on the user to always page down to the third page to select the entry every time he has to use that library. In accordance with the invention, the user can rearrange the library entries to promote or demote selected entries. For, example, the user can go down to page three, select the entry he wants to promote, and then hit a "move" button. That entry will be automatically promoted to the first entry in the library. The next time the library is displayed for that question, the promoted entry will show up on the first line of the library, and it will be faster to respond to that question.

Another situation that happens in the field is that insufficient entries are within the library. The application designer can only foresee so many possible responses so certain ones may be missing. In accordance with the invention, the user can add new entries into the library so that the next time the library is called up for that questions, the information will be available automatically. The user can then simply touch the entry to record his response, rather than having to type it in, using a simulated keyboard.

For both of these library field modification, the corresponding libraries on the host is automatically updated the next time the collected data is up-loaded. The ID that is tagged onto the floppy disk or RAM pack is used to identify the host library, and each satellite library is cross-verified with the libraries on the host computer at up-load. If any modification has been performed in information those libraries, then the host library updated to reflect the modifications for that user.

FIGS. 12A through 12F shows various illustrative interactive screen displays from an exemplary data collection application entitled "Parking Infraction Application" It is the type of data collection application which a traffic policeman would use.

Figure 12A:
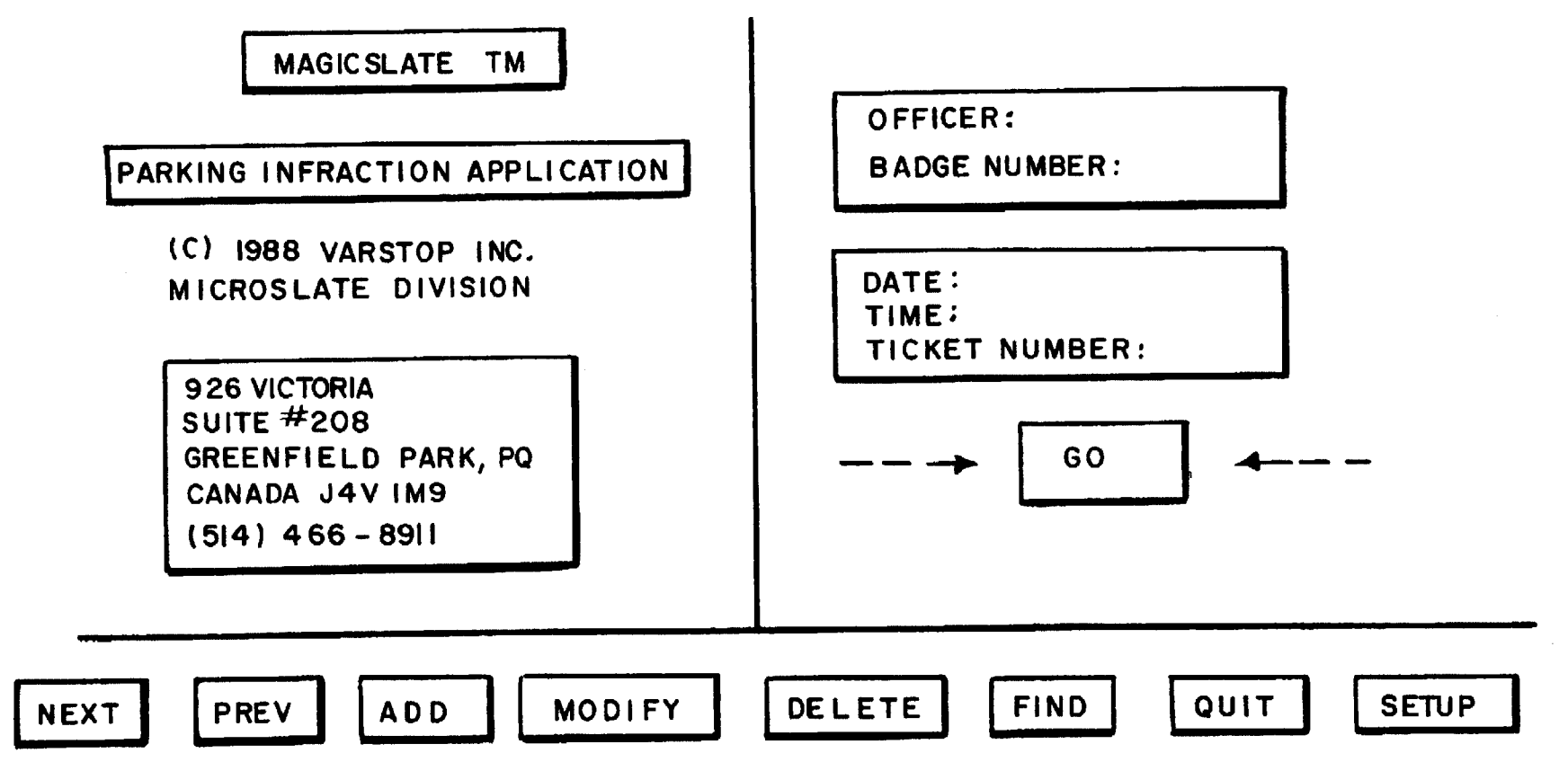

FIG. 12A shows the starting screen for execution of the application. The officer's name and badge number are preferably constant fields. The date, time and ticket number are filled in. Assuming a new infraction is to be entered, the add button is pressed.

FIG. 12B shows the next screen of the application. It calls for an identification of the state issuing the license plate on the vehicle. The required information is entered by touching the appropriate active target of the screen enclosed in one of the illustrated frames.

In the screen depicted in FIG. 12C, the vehicle year is entered by pressing the appropriate frame, and other information concerning the vehicle is entered, for example, by using a simulated keyboard.

FIG. 12D shows yet another screen. Here, instead of using the simulated keyboard to enter the model, a window is opened containing a library of possible models. Any of these can be pushed by touching the appropriate point on the screen.

Figure 12E:
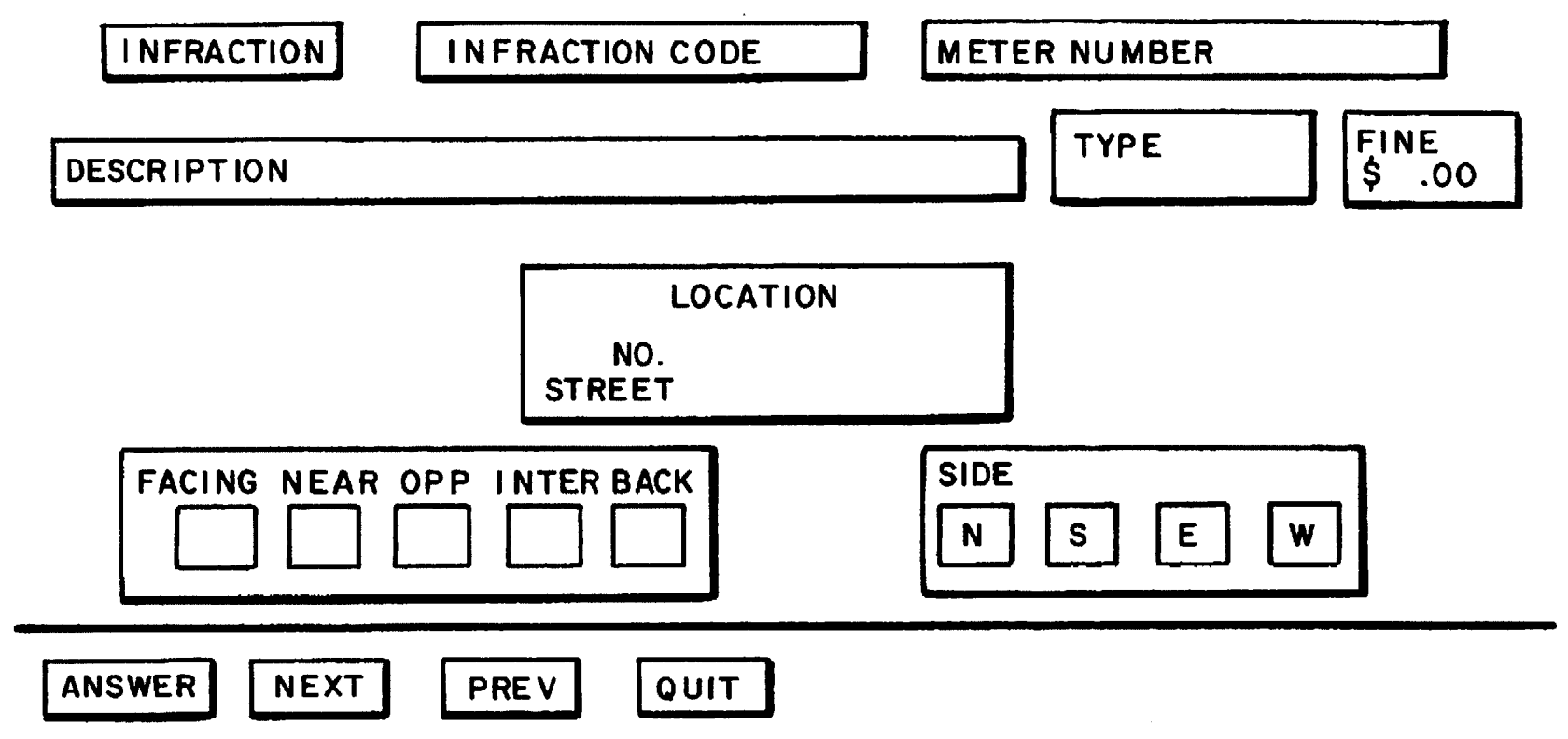

FIG. 12E seeks further information concerning the information, and can be completed using one or more of the above-described data entry devices. The infraction code is contained in a displayable library shown in FIG. 12F. One a code is selected from the library of FIG. 12F, the code field, the description and the fine are automatically entered on the FIG. 12E screen. To further clarify the application generator process, appended hereto and made a part hereof is an illustrative application generation guide.

f. Carrying Case

Figure 14:
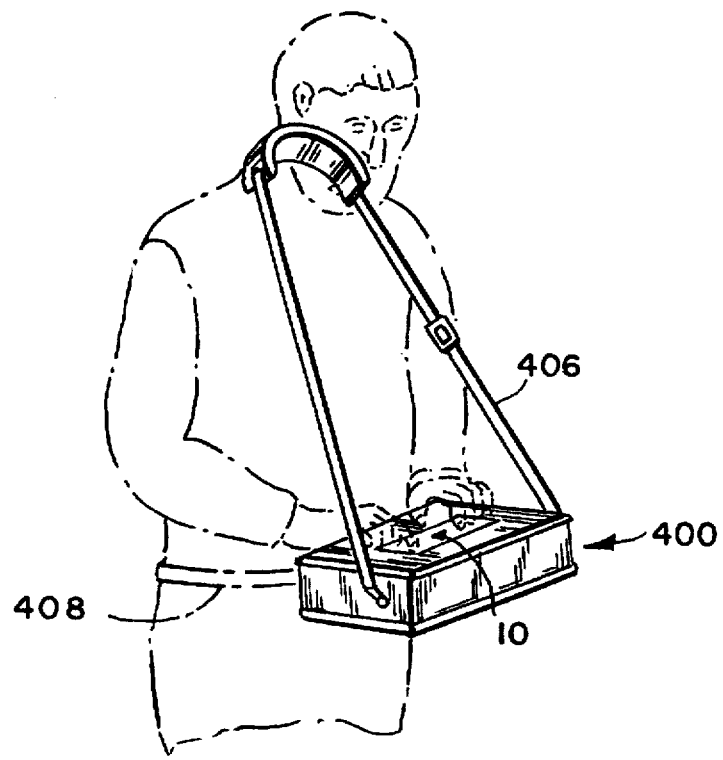
FIG. 14 is an illustration of ambulatory use of the portable computer of FIG. 1 made possible by the carrying case of FIG. 13.
Figure 13:
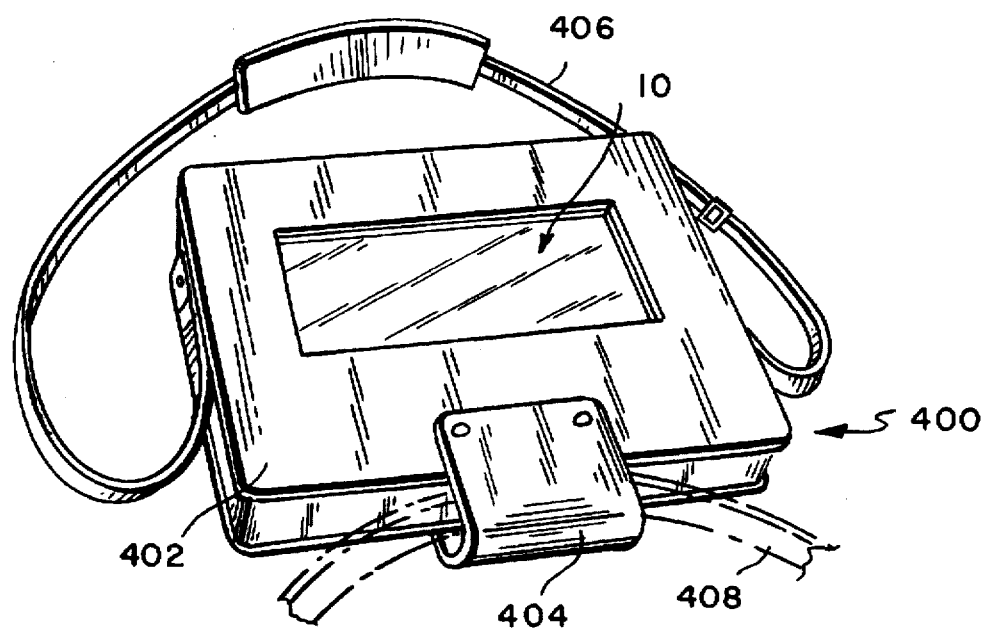
FIG. 13 is a perspective view of a carrying case for the portable computer of FIG. 1.

FIGS. 13 and 14 show an optional carrying case 400 for the portable computer 10, preferably made of leather or similar material. The carrying case 400 has a receptacle portion 402 for snugly receiving the portable computer 10 in a protective manner A re-sealable flap 404 can be used to close the receptacle portion 402 after the portable computer 10 is inserted therein, and/or is otherwise provided for purposes to be described shortly. The flap 404 forms a flat loop of material which is attached at one end to the receptacle portion 402, provided with a snug connector at its other end to releasably secure that end to the receptacle portion 402. Also provided is a carrying strap 406. The carrying strap 406 is secured at each of its ends to the receptacle portion 403 nearer the top side of the computer housing. The flap 404 is disposed proximate the bottom side of the computer housing.

Of course, the carrying strap 406 can be used as a shoulder strap to carry the portable computer 10. However, this arrange is specifically adapted for ambulatory use of the portable computer 10 as illustrated in FIG. 14. For such use, the carrying strap 406 is placed around the neck of the user with the portable computer comfortably located for use in front at waist height. The user places his belt 408 through the loop of the flap 404. Thus, the portable computer is suspended from the user's neck and maintained substantially horizontal or slightly tilted at an appropriate angle for use by the three point action of the ends of the strap 406 and the user's belt 408. In this fashion, the user has both hands free to use the portable computer 10 while he stands or walks about.

It will thus be seen that the objects set forth hereinabove among those made apparent from the preceding description, are efficiently attained. Also, certain changes may be made in the above-described construction without departing from the scope of the invention.

Therefore, it is intended that all matter contained in the above description or shown in the accompanying drawings shall be interpreted as illustrative and not in a limiting sense. It is also to be understood that the following claims are intended to cover all of the generic and specific features of the invention herein described and those made obvious herefrom.

What is intended to be covered by Letters Patent is:

1. A portable, keyboardless computer including an input/output device for entering and displaying information, said computer comprising:
   A. a memory for storing a data collection application and an operating system, said data collection application determining contents and formats of the information displayed by the input/output device;
   B. a processing unit connected to said memory for executing said data collection application;

C. an application generator operating in conjunction with said operating system to generate said data collection application and to create different functional libraries relating to said contents and said formats displayed by the input/output device; and D. a run-time executor operating in conjunction with said processing unit to execute said application and said libraries to facilitate data collection operations.

2. The portable, keyboardless computer of claim 1 further comprising means for powering said memory and processing unit.

3. The portable, keyboardless computer of claim 2 wherein a first library created by said application generator includes a sequential library of possible responses configured for display by the input/output device in selected ones of said formats.

4. The portable, keyboardless computer of claim 3 wherein a second library created by said application generator includes a consequential library of one of actions and executable instructions associated with said possible responses for changing the flow of said data collection application.

5. The portable, keyboardless computer of claim 4 wherein said possible responses are one of text and pictograms.

6. The portable, keyboardless computer of claim 5 wherein said pictograms comprise graphical images of objects and wherein a third library created by said application generator includes a pictogram library of said pictograms.

7. The portable, keyboardless computer of claim 6 wherein a fourth library created by said application generator includes a syntax library for changing the syntax of the information displayed by the input/output device.

8. The portable, keyboardless computer of claim 7 wherein said application generator further includes means for cross-referencing said responses with one of said libraries of said possible responses.

9. The portable, keyboardless computer of claim 8 wherein said application generator includes means for personalizing said libraries, together with said contents and said formats displayed by the input/output device, according to said data collection application executed by said processing unit.

10. A portable, keyboardless computer including an input/output device for entering and displaying information, said computer comprising:

a memory for storing at least one data collection application configured to determine the contents and formats of the information displayed by the input/output device;

a processor coupled to said memory for executing said data collection application; and an application generator for generating said data collection application for generating different functional libraries relating to said contents and said formats displayed by the input/output device said application generator operating in conjunction with said processor to partition said memory for storing said data collection application and libraries.

11. The computer of claim 10 wherein said libraries include:

a sequential library of possible responses configured for display by the input/output device in selected ones of said formats;

a consequential library of one of actions and executable instructions associated with said possible responses for changing the flow of said data collection application; and a syntax library for changing the syntax of the information displayed by the input/output device.

12. A portable, keyboardless computer including an input/output device for entering and displaying information, said computer comprising:

a memory for storing a data collection application and various libraries relating to contents and formats of the information displayed by the input/output device;

a processor coupled to said memory and the input/output device for executing said data collection application; and a run-time executor for executing said application and said libraries to facilitate data collection operations.

13. The unit of claim 12 wherein said libraries include:

a sequential library of possible responses configured for display by the input/output device in selected ones of said formats;

a consequential library of one of actions and executable instructions associated with said possible responses for changing the flow of said data collection application; and a syntax library for changing the syntax of the information displayed by the input/output device.

* * * * *

(12) EX PARTE REEXAMINATION CERTIFICATE (9532nd)
United States Patent
Clough et al.

(10) Number: US 5,675,362 C1
(45) Certificate Issued: Feb. 27, 2013

(54) PORTABLE COMPUTER WITH TOUCH SCREEN AND COMPUTING SYSTEM EMPLOYING SAME

(75) Inventors: William A. Clough, Bainsville (CA); Daneil Ouelette, St. Luc (CA); Serge De La Sablonniere, Ville d'Anjou (CA)

(73) Assignee: Typhonn Tunes, Inc., Carson City, NV (US)

Reexamination Request:
No. 90/009,464, May 13, 2009

Reexamination Certificate for:
Patent No.: 5,675,362
Issued: Oct. 7, 1997
Appl. No.: 08/319,464
Filed: Oct. 4, 1994

Related U.S. Application Data

(63) Continuation of application No. 08/098,219, filed on Jul. 28, 1993, now Pat. No. 5,379,057, which is a continuation of application No. 07/890,311, filed on May 26, 1992, now abandoned, which is a continuation of application No. 07/731,375, filed on Jul. 16, 1991, now abandoned, which is a continuation of application No. 07/271,237, filed on Nov. 14, 1988, now abandoned.

(51) Int. Cl.
*G06F 1/16* (2006.01)
(52) U.S. Cl. .................................................. 345/173
(58) Field of Classification Search ................. None
See application file for complete search history.

(56) References Cited

To view the complete listing of prior art documents cited during the proceeding for Reexamination Control Number 90/009,464, please refer to the USPTO's public Patent Application Information Retrieval (PAIR) system under the Display References tab.

*Primary Examiner* — Fred Ferris

(57) ABSTRACT

A portable, self-contained general purpose keyboardless computer utilizes a touch screen display for data entry purposes. An application generator allows the user to develop data entry applications by combining the features of sequential libraries, consequential libraries, help libraries. syntax libraries, and pictogram libraries into an integrated data entry application. A run-time executor allows the processor to execute the data entry application.

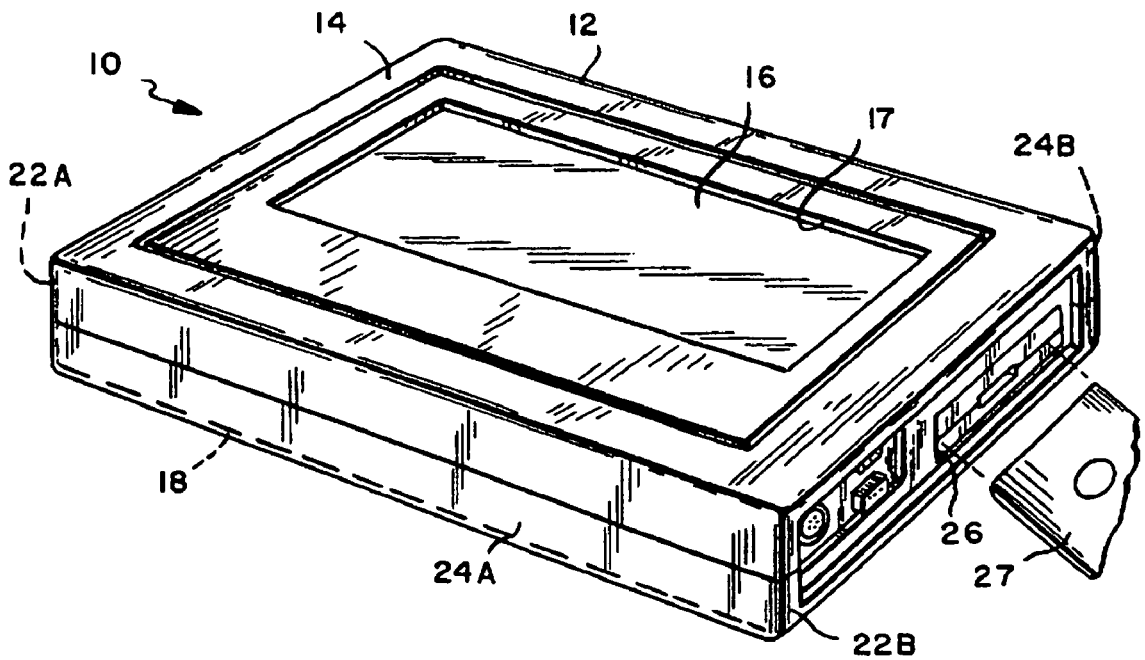

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 12 and 13 are cancelled.

Claims 1-11 were not reexamined.

* * * * *